United States Patent
Pimentel et al.

(10) Patent No.: US 8,805,910 B2
(45) Date of Patent: Aug. 12, 2014

(54) SYSTEM AND METHOD FOR GENERATING DISCRETE-TIME MODEL (DTM) OF CONTINUOUS-TIME MODEL (CTM) FOR A DYNAMICAL SYSTEM

(75) Inventors: Julio C. G. Pimentel, Kanata (CA); Emad Gad, Nepean (CA)

(73) Assignee: Kylowave Inc., Kanata (CA)

( * ) Notice: Subject to any disclaimer, the term of this patent is extended or adjusted under 35 U.S.C. 154(b) by 543 days.

(21) Appl. No.: 13/040,624

(22) Filed: Mar. 4, 2011

(65) Prior Publication Data
US 2012/0226726 A1  Sep. 6, 2012

(51) Int. Cl.
*G06F 17/10*  (2006.01)

(52) U.S. Cl.
USPC ......................................................... 708/446

(58) Field of Classification Search
None
See application file for complete search history.

(56) References Cited

U.S. PATENT DOCUMENTS

| | | | | |
|---|---|---|---|---|
| 7,689,296 | B2 * | 3/2010 | Backstrom et al. | 700/31 |
| 2006/0064291 | A1 * | 3/2006 | Pattipatti et al. | 703/14 |
| 2010/0299651 | A1 * | 11/2010 | Fainekos et al. | 717/104 |
| 2012/0150507 | A1 * | 6/2012 | Gallestey et al. | 703/2 |
| 2012/0226726 | A1 * | 9/2012 | Pimentel et al. | 708/270 |

OTHER PUBLICATIONS

International Search Report issued in corresponding application No. PCT/CA2012/000224 dated Jul. 9, 2012 (7 pages).

Pimentel, J.C.G. et al. "High-Order-Stable and -Stable and -Stable State- Space Discrete Modeling of Continuous Systems", IEEE Transactions on Circuits and Systems—I: Regular Papers, vol. 59, No. 2, Feb. 2012, pp. 346-359 See the entire article.

Gad, E. et al. "A-Stable and L-Stable High Order Integration Methods for Solving Stiff Differential Equations", IEEE Transactions on Computer-Aided Design of Integrated Circuits and Systems, vol. 28, No. 9, Sep. 2009, pp. 1359-1372 See the abstract, section I on p. 1359-1360, Section III on p. 1361 to section IX on p. 1371.

Zhou, Y. et al. "Structural Characterization and Efficient Implementation Techniques for A-Stable High-Order Integration Methods", IEEE Transactions on Computer-aided Design of Integrated Circuits and Systems, vol. 31, No. 1, Jan. 2012, pp. 101-108 See the abstract and sections I and II on pp. 101-103.

* cited by examiner

*Primary Examiner* — David H Malzahn
(74) *Attorney, Agent, or Firm* — Gowlings Lafleur Henderson LLP; Mark J. Sprigings

(57) ABSTRACT

Method and apparatus for processing continuous-time models (CTM) in a digital processing architecture is disclosed. The discrete state-space technique maps the CTM into the discrete-time model (DTM) and stores the states of the system in a sample time independent discrete state space set of matrices. The resulting state-space matrices can be processed in software or directly in hardware. The method disclosed is particularly suited to be used in automatic synthesis algorithms where a digital circuit is generated from an algorithm described in a high level language or model representation such as, for example, data flow or bond graph into a hardware description language (HDL), and the HDL model can be synthesized using system specific tools to generate an application specific integrated circuit (ASIC) or an FPGA configuration.

29 Claims, 23 Drawing Sheets

(a)

(b)

SYSTEM AND METHOD FOR GENERATING DISCRETE-TIME MODEL (DTM) OF CONTINUOUS-TIME MODEL (CTM) FOR A DYNAMICAL SYSTEM

TECHNICAL FIELD

The present disclosure relates generally to embedded and control systems and in particular to representing a continuous-time model (CTM) in a discrete-time model (DTM).

BACKGROUND

The increasing complexity and uncertainty surrounding the development of embedded applications continues to escalate their development costs and to challenge their window of opportunity. Model-based design (MBD) has emerged as a methodology capable of addressing these difficulties inherent in designing modern embedded and control systems. Ensuring that a discrete-time model (DTM) can be processed efficiently and keeping the accuracy and stability of the original continuous-time model (CTM) in predefined limits imposes a burdensome constraint upon the design of the system algorithms and hardware architecture.

Techniques for finding the discrete-time representation of a CTM typically fall into one of three major classes. The first and perhaps the simplest methodology is known as the matched pole-zero approximation method. It is based on the idea that when applying the Z-transform on a given system, then poles of the continuous system (wp) and those of the discrete equivalent (zp) are related via the exponential relation $zp=e^{\{wp\}}$. Unfortunately, such an exponential relation is not accurate enough to map the zeros of the continuous system. To overcome this problem, the matched pole-zero method relies on a series of heuristic rules based on the relation $z=e^{\{sT\}}$ and adjusting the gain of the discrete system to match the low frequency gain of the continuous system. A summary of those heuristic rules can be widely found in the literature. The second approach, known as Hold Equivalent Models, seeks to approximate a CTM with transfer function H(s) through sampling the input, e(t), at discrete time points, $t=nT$, $n=0, 1, 2, \ldots$, holding the samples through some means in the interval $nT<=t<=(n+1)T$, using the output of the holder to drive the CTM, and sampling its output at the same discrete time instants. The notion of holding the sample is typically carried out through a set of approximating polynomials, where, the approximating polynomials could have orders equal to zero or one leading to hold equivalents that are called zero-order (ZOH) and first-order hold (FOH). Although higher-order holders are possible, they are not normally used in practical applications because it can be difficult to obtain, expensive and result in lower performance. The third approach known as the s-to-z Mapping Models is typically constructed by considering a numerical solver of a system of differential equations. The solver is typically used to approximate the exact solution, denoted by x(t), of differential equations at discrete time instants, i.e., $t=t_n$, $n=1, 2, 3 \ldots$, through its previously known past points on the solution, i.e. at $t=t_m$ (m<n), its derivatives at past points or combinations thereof.

Stability and accuracy are two important issues that must be addressed in any approach used to construct a DTM in any approach. The accuracy of a DTM is usually expressed by the order of the rule approximating the CTM. This order is an integer number, where higher-order typically means higher accuracy. Stability, on the other hand loosely speaking, refers to the notion of having stable poles for the DTM whenever its CTM counterpart is stable with stable poles. A desirable DTM is therefore a stable model with the highest possible order. More specifically, the key challenge to develop modern high accuracy embedded applications is not simply generating high-order DTM approximations, but also guaranteeing their unconditional stability.

A particular problem with the construction of the DTM based on the third approach is that the numerical solver usually used for that purpose has an inherent conflict between stability and order. In other words, the stability regions decrease with increasing order. Thus a DTM with high-order is more likely to be unstable, and thereby defeating the purpose of the high-order. Indeed, it has been proven that numerical solvers based on general integration formulas (IF) such as Linear Multi Step (LMS) methods cannot be unconditionally stable (or A-stable) if its order increases beyond order 2. As a result, all s-to-z mapping techniques derived from LMS-IF formulae will inherit this conflict making it impossible to obtain unconditionally stable DTM approximations of a CTM of orders higher than 2. Given that embedded systems are required to be faster and with more complex structure, the need for high speed and high accuracy discretization methods will be exacerbated.

It is well-known that the goal of embedding a DTM model of a CTM in hardware is fraught with many difficulties, such as
1. Embedded processors have limited resources as well as limited speed and power requirements.
2. Practical realization of a DTM in hardware such as a signal processing circuit should not incur a faster-than-linear growth in memory or processing resources, given the limited resources on these circuits mentioned above.
3. Accuracy and stability are two requirements that are indispensable and that must be preserved in the DTM model. However, as noted earlier, those two requirements are always in conflict, making that one must be always obtained at the expense of the other.

Therefore there is a need for an improved system, method and apparatus for mapping a continuous-time model (CTM) into a discrete-time model (DTM).

SUMMARY

In accordance with an aspect of the present disclosure there is provided a method for execution by a processor of converting a continuous-time model (CTM) to a discrete time model (DTM), the method comprising: determining a sampling time and CTM state-space matrices [A, B, C, D] defined for a dynamical system ordinary differential equation mathematical formulation; determining an order of approximation [i,j,k] parameters of the coefficients of an Obreshkov integration formula, to be used in determining the DTM $[A_{dm}, B_{dm}, C_{dm}, D_{dm}]$ to provide an approximation of accuracy and to meet A- or L-stability requirements defined for the dynamical system; and discretizing the CTM into a DTM using the selected order of approximation [i,j,k], and the CTM state-space matrices [A, B, C, D] and sampling time by calculating Obreshkov coefficient and matrices $[A_{dm}, B_{dm}, C_{dm}, D_{dm}]$ using Obreshkov-based polynomial matrices.

In accordance with another aspect of the present disclosure there is provided an apparatus for converting a continuous-time model (CTM) to a discrete time model (DTM), the apparatus comprising: a processor for executing the instructions for performing: receiving a DTM output, input signals determining a sampling time and CTM state-space matrices [A, B, C, D] defined for a dynamical system ordinary differential equation mathematical formulation; determining an order of approximation [i,j,k] parameters of the coefficients of an Obreshkov integration formula, to be used in determining the DTM [$A_{dm}$, $B_{dm}$, $C_{dm}$, $D_{dm}$] to provide an approximation of accuracy and to meet A- or L-stability requirements defined for the dynamical system; and discretizing the CTM into a DTM using the selected order of approximation [i,j,k], and the CTM state-space matrices [A, B, C, D] and sampling time by calculating Obreshkov coefficient and matrices [$A_{dm}$, $B_{dm}$, $C_{dm}$, $D_{dm}$] using Obreshkov-based polynomial matrices.

In accordance with yet another aspect of the present disclosure this is provided An apparatus for executing a discrete time model (DTM) the apparatus comprising: a processor for executing the instructions for performing: computing an approximation for the output signals y(nT) at the sampling time (T) comprising:

$$w_m(n+1,T) = A_{dm}w_m(n,T) + B_{dm}u(n,T)$$

$$x^*_m(n,T) = C_{dm}w_m(n,T) + D_{dm}u(n,T)$$

where the DTM output is defined by:

$$Y(z) := DU(z) + C\sum_{m=0}^{k} X^*_m(z)$$

or equivalently $$y(n, T) := Du(n, T) + \sum_{m=0}^{k} x^*_m(n, T)$$

using DTMs defined by [Adm, Bdm, Cdm, Ddm] for a continuous-time model (CTM) discretized using a selected order of approximation [i,j,k], and CTM state-space matrices [A, B, C, D] and a sampling time by calculated by Onreshkov coefficient and matrices [Adm, Bdm, Cdm, Ddm] using Obreshkov-based polynomial matrices where wm is an auxiliary state variable, n is the timestep number, z is the z-transform variable and Xm is the dynamical system state variable.

BRIEF DESCRIPTION OF THE DRAWINGS

Further features and advantages of the present disclosure will become apparent from the following text with reference to the subsequent detailed description which are illustrated in the attached drawings, taken in combination with the drawings wherein.

Figure 1:
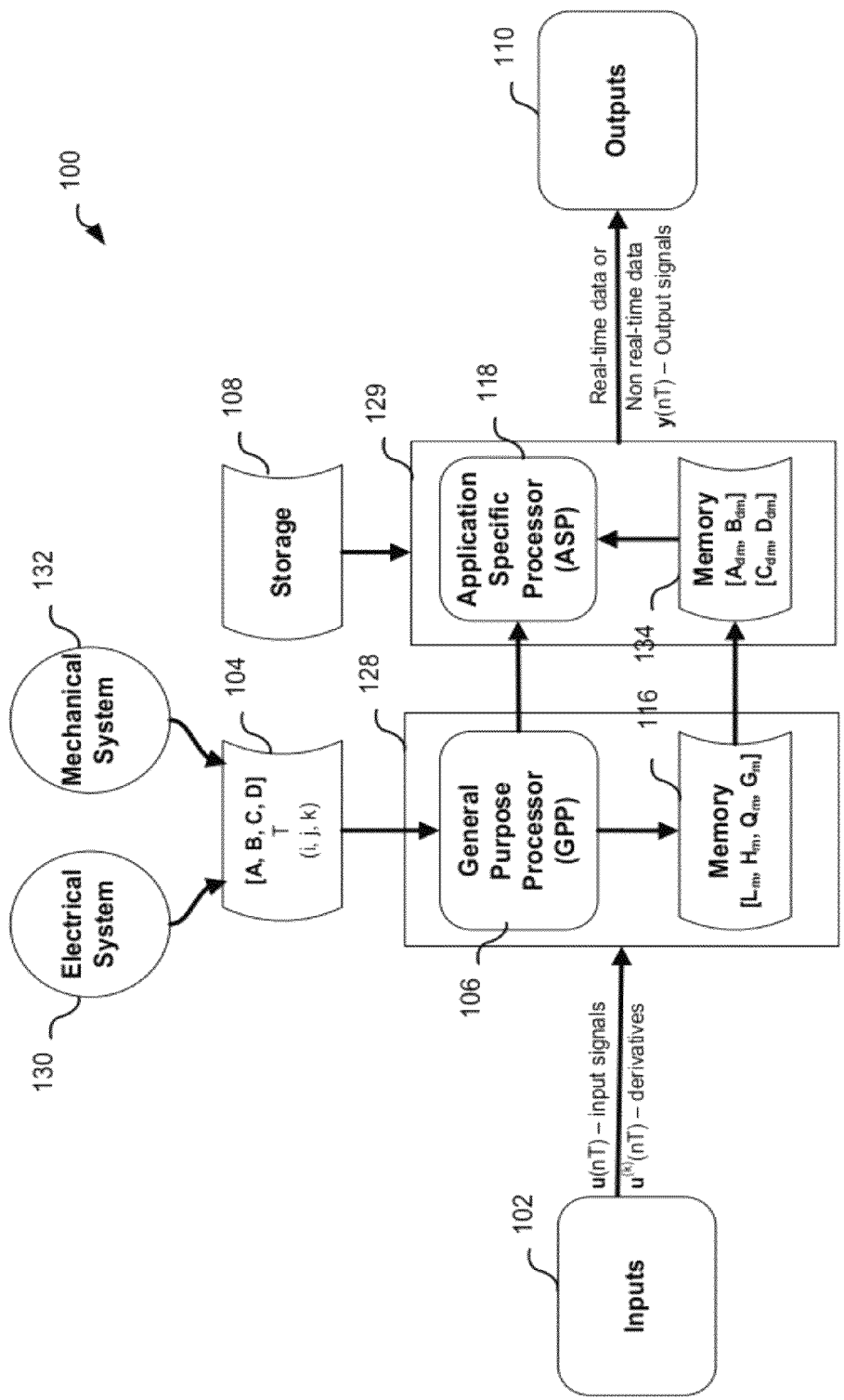
FIG. 1 shows a representation of a high level view of sampled data systems used for off-line and real-time processing and its implementation in hardware or in software.

It will be noted that throughout the appended drawings, like features are identified by like reference numerals. The reference symbols used in the drawings, and their meanings, are listed in summary form in the list of reference symbols. In principle, identical parts are provided with the same reference symbols in the figures.

DESCRIPTION

Embodiments are described below, by way of example only, with reference to FIGS. 1-23.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

This disclosure relates to converting a continuous-time model to a discrete-time equivalent model (DTM) capable of predicting CTM outputs at the sample times, and to implementing the DTM in a signal processing circuit for electrical or mechanical dynamical system. The signal processing circuit is preferably, but not limited to, a digital computer, a microprocessor, a microcontroller, a digital signal processor (DSP), application specific integrated circuit (ASIC) or an FPGA (Field Programmable Gate Array). The method disclosed is particularly suited to be used in automatic synthesis algorithms where a digital circuit is generated from an algorithm described in a high level language or model representation such as, for example, data flow or bond graph into a hardware description language (HDL), and the HDL model can be synthesized using system specific tools to generate a particular hardware configuration.

The present disclosure provides a method and apparatus for direct application of a continuous-time state-space formulation describing the representation of a continuous-time system to sampled data. It is well known from the control system theory a CTM state space formulation can be transformed to an s-domain transfer function and vice-versa. This well-known relationship between the CTM state-space formulation and an s-domain linear transfer function representation allows the disclosure to be applied to the latter formulation as well. The resulting discrete-time state-space is guaranteed to be unconditionally stable independently of the order of the approximation. The disclosure is particularly useful for implementing CTMs of large complex systems directly in hardware using, for example but not limited to, ASICs and FPGAs.

FIG. 1 is an exemplary sampled data system 100 suitable used for off-line and real-time processing and its implementation in computing hardware, such as an field programmable array (FPGA), Application Specific Integrated Circuit (ASIC), general purpose processor (GPP) or application specific processor (ASP), or in software executed processor, or a combination of both. In FIG. 1, the General purpose Processor (GPP) 106 in the DTM computation block 128 receives a set of parameters 104 comprising of the state space formulation [A, B, C, D] from describing the representation of a continuous-time system such as electrical system 130 or mechanical system 132, the sampling time T and the order of the approximation [i, j, k], and computes coefficients and matrices which are stored in a memory device 116. The GPP 106 in the output computation block 128 uses these coefficients and matrices to compute k sets of state-space matrices $[A_{dm}, B_{dm}, C_{dm}, D_{dm}]$ of the equivalent DTM and stores the DTM in a storage device 134. The subscript d in the state-space matrix refers to the matrix for the for the discrete time model and m subscript refers to the parameter k of the order of the discretization such that 0<=m<=k as described in connection with FIG. 4. Alternatively, the GPP 106 can also send the DTM matrices directly to the Application Specific Processor (ASP) 118. The ASP 118 receives the value of the inputs U(nT) and its k-order derivatives $U^{(k)}$(nT) at the sampling time directly from an input source 102 that would be provided to for example the electrical system 130 or mechanical system 132. The input source may be for example an embedded system, from a communication interface, or from a storage device and computes the estimated value of the outputs Y(nT) at the sampling time. The ASP 118 provides the outputs 110 and may store them in a storage device to be further processed later or sends the outputs directly to the following embedded system or through a communication interface.

Figure 2:
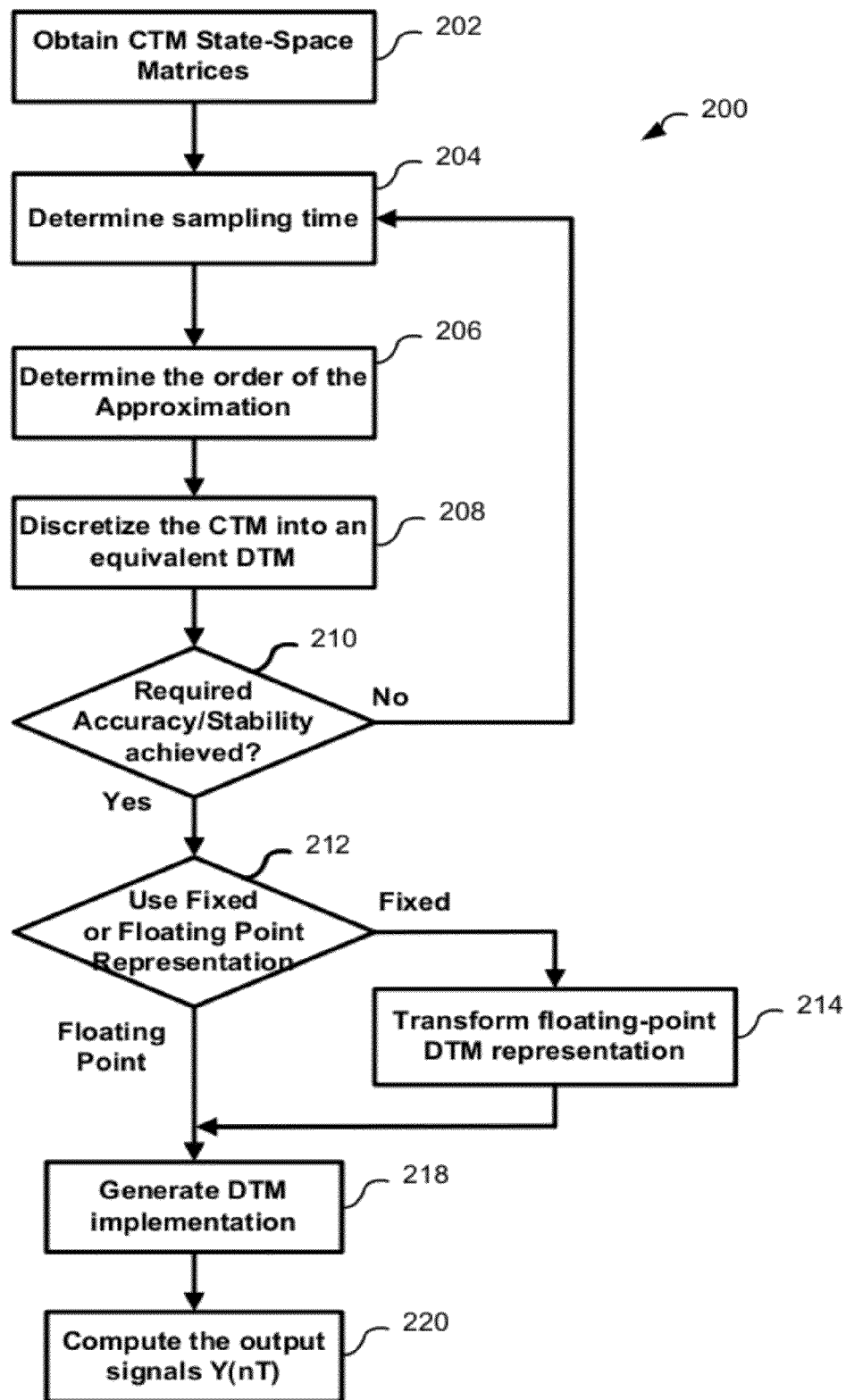
FIG. 2 shows a representation of a flowchart of a method for processing sampled data system using discrete-time state-space formulation.

FIG. 2 illustrates CTM to DTM mapping method (200). The method commences with obtaining CTM state-space matrices (202) for a dynamical system ordinary differential equation mathematical formulation defined relative to the target electrical system 130 or mechanical system 132. The sampling time is determined based (204) based upon the hardware or software processing constraints of the DTM implementation and may be provided as a range for selection based upon the outcome of the discrimination of the CTM to an equivalent DTM or based upon the data sample input to the DTM. The order of approximation defined by the DTM [i, j, k] parameters that are related to the coefficients of the Obreshkov integration formula (IF) are chosen (206) relative to the application to achieve desired accuracy and stability. Two criteria of stability can be achieved based on the relation of the parameters i and j. A-stability as specified in [0005] can be achieved when the parameter i is set equal to j. A tighter form of stability, known as L-stability, can be achieved if the condition i=j+1 or i=j+2 is satisfied. The latter form of stability has the additional advantage of suppressing oscillations much faster than the former. Those stability criteria are defined for the dynamical system requirements determined in relation to the electrical or mechanical system input, output and internal state variables. The CTM is then discretized into an equivalent DTM (208) by using a set of parameters comprising the state space formulation describing the representation of a continuous-time system such as electrical system 130 or mechanical system 132, the sampling time and the order of the approximation. Coefficients and matrices are computed and utilized to compute k sets of matrices $[A_{dm}, B_{dm}, C_{dm}, D_{dm}]$ of the equivalent DTM using Obreshkov-based polynomial matrices operation. If the DTM accuracy and stability do not match the desired values (NO at 210) the sampling time and/or order of the approximation is chosen again (204/206) depending on implementation constraints. If the accuracy and stability does match the desired values (YES at 210), it is then determined if a fixed point or floating point representation is to be used to implement the DTM (212). If a fixed point representation is to be used the DTM floating-point representation is transformed to a fixed-point DTM representation by performing scaling and quantization of the data to account for a decrease in resolution when transforming from the floating-point representation (214). Proper scaling of the DTM matrices such as the L2-norm dynamic range scaling method can be performed to increase accuracy of the model by ensuring the entries of the A, B, and C matrices are homogenous in magnitude and the DTM characteristics are insensitive to small perturbations in A, B, and C (in comparison to their norms) and quantization can be performed by truncation or rounding of the elements of the DTM matrices.

Figure 4:
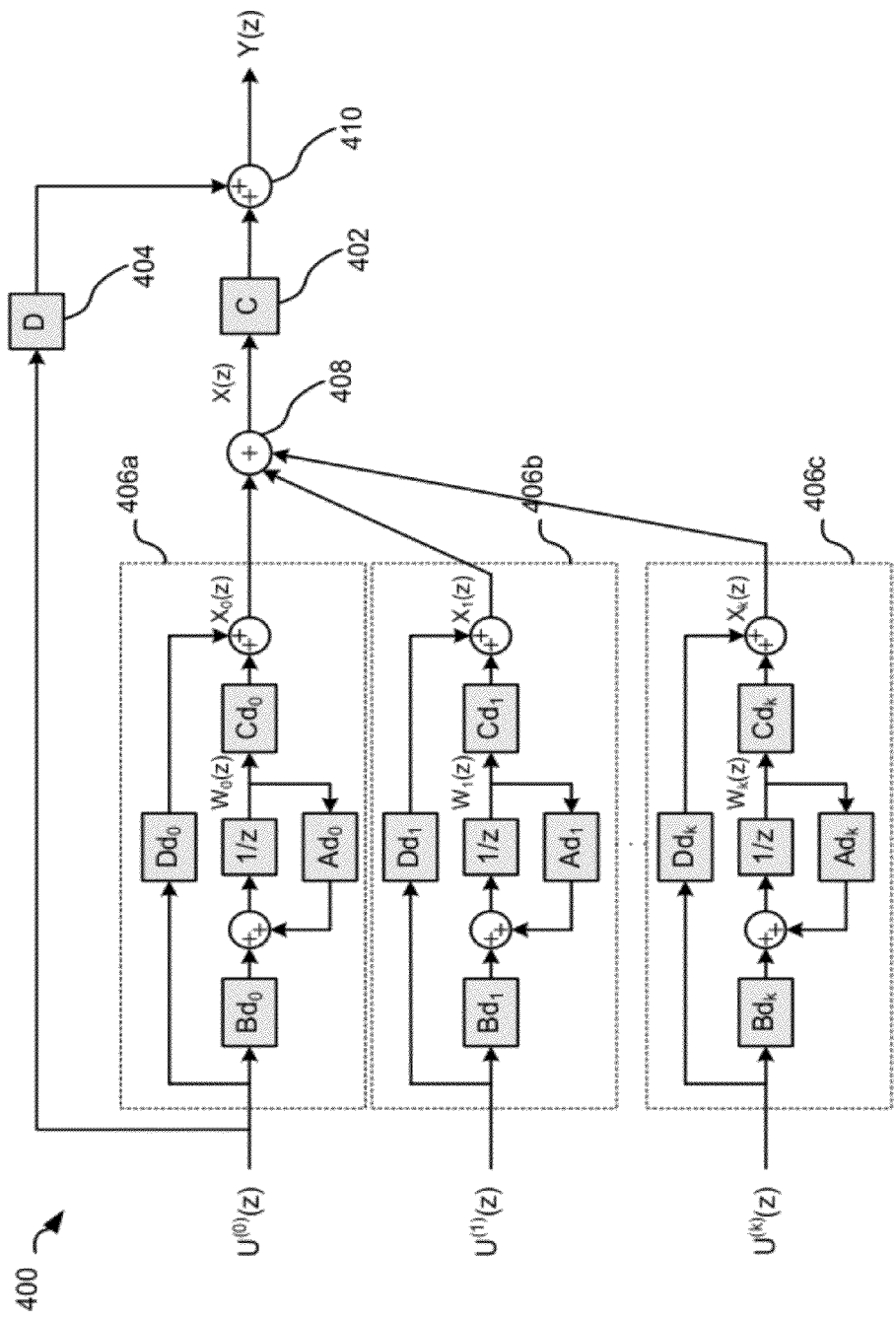
FIG. 4 shows a block diagram of a high-order high-derivatives DTM equivalent.

The DTM can then be implemented in hardware or software (218). The DTM module implemented in software or in hardware uses the value of the inputs U(nT) and its k-order derivatives $U^{(k)}$(nT) at the sampling time 102 to compute (218) the output signals Y(nT) 110. The DTM module can be implemented in a single processor or in multiple processors, but not limited to, as an association of zero-order DTMs $[A_{dm}, B_{dm}, C_{dm}, D_{dm}]$ of 406 as shown in FIG. 4. The partial result of each zero-order DTM module is summed 408 to produce the estimated value of a state space vector at the sampling time X(nT) 400.

The implementation of zero-order DTM enables improved overflow detection and management by isolating the system complexity into self-contained modules which are the zero-order DTM. During execution of the DTM any overflow conditions can be uniquely identified and traced back to the specific zero-order DTM enabling adjustment the scaling and quantization to be performed.

The Obreshkov IF belongs to a general class of methods to approximate a solution of general differential equations (DE).

The single-step version of these methods takes the following form:

$$\sum_{k=0}^{j}(-1)^k \alpha_{j,i,k} T^k x_n^{(k)} = \sum_{k=0}^{i} \alpha_{i,j,k} T^k x_{n-1}^{(k)}$$

The Obreshkov coefficients $\alpha_{j,k,i}$ are computed by substituting $x_n$ and $x_{n-1}$ (the approximate solution) with $x(t_n)$ and $x(t_{n-1})$ (the exact solutions), expanding in Taylor series around $t=t_{n-1}$, and equating similar powers of T to obtain:

$$\alpha_{i,j,k} = \frac{(i+j-k)! i!}{(i+j)! k! (i-k)!}$$

Obreshkov showed that $x_n$ obtained from the equation above approximates the exact $x(t_n)$ to order $O(T^{i+j})$, i.e., $x_{n+1} = x(t_{n+1}) + O(T^{i+j+1})$, where T is the time step from $t_{n+1}$ to $t_n$. One of the pivotal advantages of the Obreshkov IF is that it can be made A-stable or L-stable only through using the appropriate choice of the integers j and k. Another advantage that should be stressed here is that the order or the accuracy of the Obreshkov IF represents absolutely no barrier to the desirable stability properties. Indeed, the method can be made of arbitrary high-order without compromising either the A- or L-stability. This fact should be contrasted against the LMS-IFs which lose these properties as soon as the order crosses the value of 2. Furthermore, the coefficients of the IF are available in closed-form for arbitrary high-order.

Despite the obvious advantages of the Obreshkov IF, adopting it to derive an s-to-z mapping with the same desirable properties and using it in hardware and software implementation is fraught with implementation challenges. The present disclosure addresses these challenges enabling implementation in both software and hardware solutions of a DTM with novel desirable properties.

To show the first basic challenge in this regard, the above artifice of replacing the differential operator $d^i/dt^i$ by powers of s is used, and the shift operator $x_{n+1}$ by $Zx_n$. This leads to the following relation:

$$z = \frac{\sum_{k=0}^{i} \alpha_{i,j,k}(sT)^k}{\sum_{k=0}^{j}(-1)^k \alpha_{j,i,k}(sT)^k}$$

It should be obvious from the above equation that the main difficulty with the Obreshkov IF is that it does not offer the s-to-z mapping but rather a z-to-s with no obvious way to recover the inverse mapping. Thus, a new methodology is needed here in order to adopt the Obreshkov formula in the discretization of CTMs.

This is accomplished with a discrete-time state-space representation obtained through an Obreshkov-based mapping to map the state-space matrices of the CTM into matrices of the DTM system. It is assumed, without lack of generality, that a CTM is described by the following state-space representation:

$$\frac{dx(t)}{dt} = Ax(t) + Bu(t) \qquad (1a)$$
$$y(t) = Cx(t) + Du(t)$$

For the particular case of linear time-invariant systems (LTI), equation 1a can be written as $$x(t) = e^{A(t-t0)}x(t0) + \int_{t0}^{t} e^{A(t-\tau)} B(\tau)u(\tau) d\tau \qquad (1b)$$

Where $x(t) \in \mathcal{R}^n$, $u(t) \in \mathcal{R}^m$ and $y(t) \in \mathcal{R}^p$ are vectors representing the states, the inputs and the outputs of the system respectively, whereas $A \in \mathcal{R}^{n \times n}$, $B \in \mathcal{R}^{n \times m}$, $C \in \mathcal{R}^{p \times n}$ and $D \in \mathcal{R}^{p \times m}$ are the matrices describing the dynamics of the CTM. $\phi(t,\tau) = e^{A(t-\tau)}$ is the continuous-time state transition matrix. On the other hand, the state-space representation of the DTM can be carried out using the following notation:

$$x^*(n+1,T) = A_w x^*(n,T) + B_w u(n,T)$$
$$y^*(n,T) = C_w x^*(n,T) + D_w u(n,T) \qquad (2a)$$

And, for the case of LTI systems, equation 2a can be written as $$x(n+1, T) = e^{AT} x(n, T) + \int_0^T e^{AT} B(\tau) u(\tau) d\tau \qquad (2b)$$

Where the superscript (*) is used to emphasize that these are the states and the outputs of the discretized system and therefore are approximations of x(nT) and y(nT), T being the sampling period and k is a constant such that $n \geq 0$.

In case the representation of a continuous-time system such as electrical system 130 or mechanical system 132 is provided as the transfer function representation of equation 3, it can be converted into a continuous-time state-space representation in which $$H(s) = \frac{b_0 s^N + \ldots + b_{N-1} s + b_N}{s^N + \ldots + a_{N-1} s + a_N} \qquad (3)$$

$$A = \begin{bmatrix} 0 & 1 & 0 & \ldots & 0 \\ 0 & 0 & 1 & \ldots & 0 \\ \vdots & \vdots & \vdots & \ddots & \vdots \\ 0 & \cdots & 0 & 0 & 1 \\ -a_N & \cdots & -a_3 & -a_2 & -a_1 \end{bmatrix} \quad B = \begin{bmatrix} 0 \\ \vdots \\ 0 \\ 0 \\ 1 \end{bmatrix}$$

$$C = [(b_N - b_0 \cdot a_N) \; (b_2 - b_0 \cdot a_2) \; (b_1 - b_0 \cdot a_1)]$$

$$D = b_0$$

The CTM state-space matrices [A, B, C, D] can be mapped to the discrete-time ones $[A_w, B_w, C_w, D_w]$. The Backward Euler and the Tustin mappings are the most well-known examples of a first and a second order mapping respectively. The former is A- as well as L-stable but is of low order. The second has higher order but is not L-stable. The embodiments described in the following sections circumvent those hurdles.

Central to the following development is the concept of the z-domain transfer function which for the DTM representation above is given by the m×p z-dependent matrix of equation 4.

$$Y_w(z) := D_w + C_w(zI - A_w)^{-1} B_w X_w(z) \quad (4)$$

Initially the CTM of equation 1 is differentiated (k−1) times to obtain:

$$x^{(k)}(t) = A x^{(k-1)}(t) + B u^{(k-1)}(t) \quad (5)$$

Where the superscript (k) denotes the k-th order derivative with respect to t, with $x^{(0)}(t) = x(t)$. Substituting recursively produces:

$$x^{(k)}(t) = A^k x^{(0)}(t) + \sum_{m=1}^{i} A^{k-m} B u^{(m-1)}(t) \quad (6)$$

Discretization of Zero Order Holding Systems

A very important class of embedded applications consist of sampled data systems where the inputs are sampled by some sort of zero order holder (ZOH) circuits. Some examples are digital control systems and discrete-time filters. In this special case, the inputs are kept constant between two consecutives sampling periods. Therefore, all high-order derivatives vanish locally which in turn allow us to simplify equation 6 to:

$$x^{(k)}(t) = A^k x^{(0)}(t) + A^{k-1} B u^{(0)}(t) \quad (7)$$

Substituting the exact trajectory, i.e. x(t), $t = t_{n+1}$ and $t = t_n$, in place of the approximate trajectory $x_{n+1}$ and $x_n$, respectively, in the Obreshkov IF results in an error term proportional to the order of the consistency of IF of equation 8.

$$\sum_{k=0}^{j}(-1)^k \alpha_{j,i,k} T^k x^{(k)}(t_{n+1}) = \sum_{k=0}^{i} \alpha_{i,j,k} T^k x^{(k)}(t_n) + O(T^{i+j+1}) \quad (8)$$

Substitution of equation 7 in equation 8 yields equation 9.

$$\sum_{k=0}^{j}(-1)^k \alpha_{j,i,k}(AT)^k x^{(0)}(t_{n+1}) - \sum_{k=0}^{i} \alpha_{i,j,k}(AT)^k x^{(0)}(t_n) = \\ -\sum_{k=0}^{j}(-1)^k \alpha_{j,i,k}(AT)^{k-1}(BT)u(t_{n+1}) + \\ \sum_{k=0}^{i} \alpha_{i,j,k}(AT)^{k-1}(BT)u(t_n) + O(T^{i+j+1}) \quad (9)$$

Recalling that $x(t_{n+1}) = x(t_n + T)$, and that $Z\{x(t_n)\} = X(z)$ implies that $Z\{x(t_{n+1})\} = zX(z)$. Then, neglecting the error term $O(T^{j+k+1})$ in equation 9 and taking the Z-transform on both sides of equation 9 yields:

$$\left(z\sum_{k=0}^{j}(-1)^k \alpha_{j,i,k}(AT)^k - \sum_{k=0}^{i} \alpha_{i,j,k}(AT)^k\right) X^*(z) = \\ \left(-z\sum_{k=1}^{j}(-1)^k \alpha_{j,i,k}(AT)^{k-1} + \sum_{k=1}^{i} \alpha_{i,j,k}(AT)^{k-1}\right)(BT)U(z) \quad (10)$$

Where $X^*(z)$ is used instead of $X(z)$ to highlight the fact that equation 10 produces only an approximation to the exact X(z) after neglecting the error term. Manipulating equation 10 algebraically we find that $$X^*(z) = \left[(z\alpha_{j,i,0} - \alpha_{i,j,0})I + (AT)\left(z\sum_{k=1}^{j}(-1)^k \alpha_{j,i,k}(AT)^{k-1} - \sum_{k=1}^{i} \alpha_{i,j,k}(AT)^{k-1}\right)\right]^{-1} \\ \left(-z\sum_{k=1}^{j}(-1)^k \alpha_{j,i,k}(AT)^{k-1} + \sum_{k=1}^{i} \alpha_{i,j,k}(AT)^{k-1}\right)(BT)U(z) \quad (11)$$

Defining H(AT) and L(AT) as the following z-independent polynomial matrices $$H(AT) := \sum_{k=1}^{j}(-1)^k \alpha_{j,i,k}(AT)^{k-1} \quad (12)$$

$$L(AT) := \sum_{k=1}^{i} \alpha_{i,j,k}(AT)^{k-1} \quad (13)$$

And choosing $$K(z) = zI - L(AT)H^{-1}(AT) \quad (14)$$

Equation 14 can be rewritten as $$X^*(z) = -[(z\alpha_{j,i,0} \alpha_{i,i,0})I + (AT)K(z)H(AT)]^{-1} K(z)H(AT) (BT)U(z) \quad (15)$$

It should be noted that the term inside the brackets is a linear function in z, thus can be written as $$X^*(z) = -[K(z)G(AT) + Q(AT)]^{-1} K(z)H(AT)(BT)U(z) \quad (16)$$

Where $$G(AT) = \alpha_{j,i,0} I + (AT)H(AT) \quad (17)$$

$$Q(AT) = -\alpha_{j,i,0} I + \alpha_{j,i,0} L(AT)H^{-1}(AT) \quad (18)$$

For sake of clarity we will drop the arguments of the functions. Thus, manipulating equation 16 algebraically can be written:

$$X^*(z) = [-G^{-1} + G^{-1}(zI - (LH^{-1} - QG^{-1}))^{-1} QG^{-1}] H(BT)U(z) \quad (19)$$

And recognizing that equation 19 has the same form as the DTM canonical representation of equation 4 where $X^*(z)$ correspond to the system output $Y_w(z)$. In equation 19, the polynomial matrices L, H, G and Q are defined above, U(z) are the inputs, [A, B, C, D] are the CTM state-space matrices, T is the sampling period and $[A_d, B_d, C_d, D_d]$ are state-space matrices that produce the discrete-time state variable $X^*(z)$ given by:

$$A_d = L(AT)H^{-1}(AT) - Q(AT)G^{-1}(AT) \quad (20)$$

$$B_d = Q(AT)G^{-1}(AT)H(AT)(BT) \quad (21)$$

$$C_d = G^{-1}(AT) \quad (22)$$

$$D_d = -G^{-1}(AT)H(AT)(BT) \quad (23)$$

Such that $$D_d = -G^{-1}(AT)H(AT)(BT) \quad (24)$$

Then, the expression of the system outputs at the sample times are given by:

$$Y(z):=C(D_d+C_d(zI-A_d)^{-1}B_d U(Z))+DU(z) \quad (25)$$

Therefore the DTM state-space matrices $[A_d, B_d, C_d, D_d]$ corresponding to the discretization of the original continuous-time model are given by $$A_w = A_d = L(AT)H^{-1}(AT) - Q(AT)G^{-1}(AT) \quad (26)$$

$$B_w = B_d = Q(AT)G^{-1}(AT)H(AT)(BT) \quad (27)$$

$$C_w = CC_d = CG^{-1}(AT) \quad (28)$$

$$D_w = D + CD_d = D - CG^{-1}(AT)H(AT)(BT) \quad (29)$$

Thus, equations 26-29 provide the desired mapping from continuous to discrete-time domain of a zero order holder system.

Figure 3:
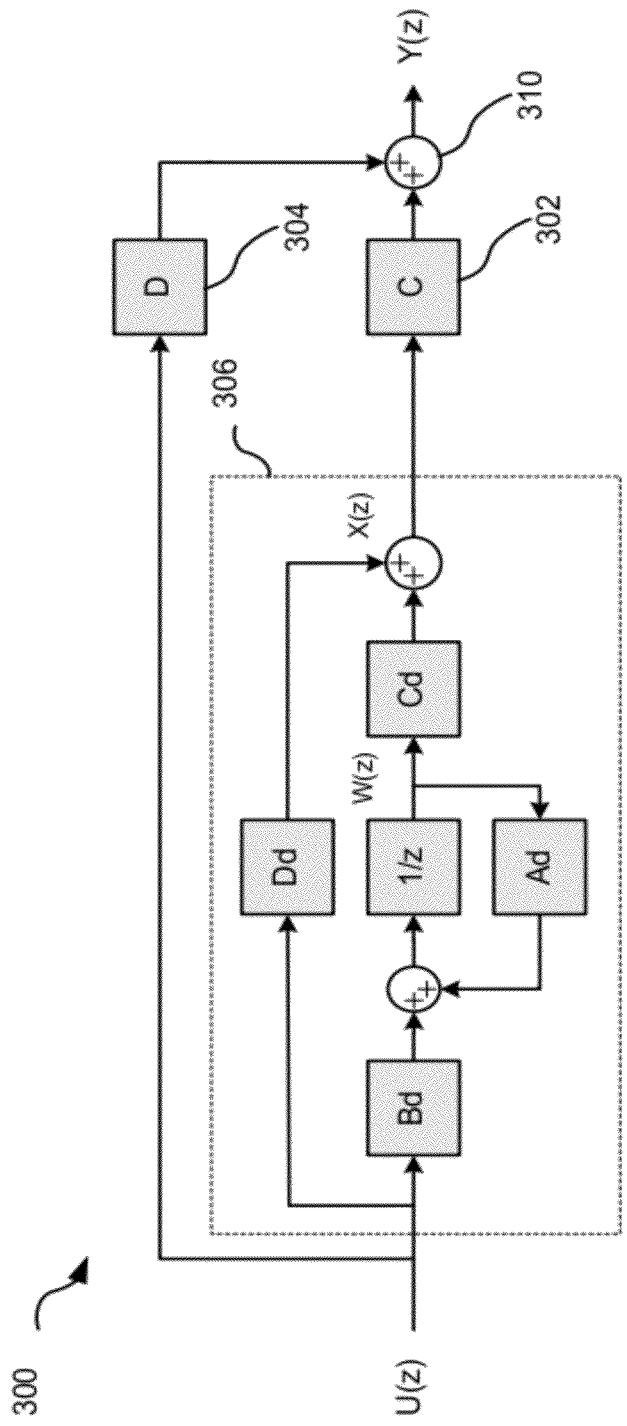
FIG. 3 shows a block diagram of a zero-order holder (ZOH) DTM equivalent.

FIG. 3 illustrates CTM to DTM mapping and a method of computing the output signals at the sampling time y(nT) 300 for a zero order holder system. FIG. 3 depicts the structure of the DTM obtained using the discretization method where matrices $[A_d, B_d, C_d, D_d]$ of 306 are functions of the Obreshkov coefficients, a state matrix A and a CTM matrix B as shown in equations 20-23 and 26-29. The value x(nT) of the state vector X(z) at the sampling time can be estimated from the value u(nT) of the inputs U(z) at the sampling time and the zero-order DTM 306. The value y(nT) of the outputs Y(z) at the sampling time can be computed from the values of x(nT) and u(nT), the CTM matrices C 302 and D 304, and the summation 310. The mapping provides a high-order approximation for the continuous-time state and input matrices A and B, where the high-order derivatives of the inputs have vanished. The parameters (i, j) of the Obreshkov coefficients can be used to configure the order of the discrete-time approximation such that it is unconditionally stable if and only if $j-2 \le i \le j$.

Discretization of High Order Inputs Systems

This section extends the results of the previous subsections to the general case where the input to the system could be presented with high-order holder circuits. Thus, higher-order derivatives are made available. In this case we will assume that $u^{(p)}(t)=0$, $\forall p \le k$, and 0 otherwise. Substitution of equation 6 into equation 8 allows us to generalize equation 11 as follows:

$$X^*(z) = \Bigg[(z\alpha_{j,i,0} - \alpha_{i,j,0})I + \quad (30)$$

$$(AT)\bigg(z\sum_{k=1}^{j}(-1)^k \alpha_{j,i,k}(AT)^{k-1} - \sum_{k=1}^{i}\alpha_{i,j,k}(AT)^{k-1}\bigg)\Bigg]$$

$$\bigg(-z\sum_{m=1}^{j}\sum_{k=m}^{j}(-1)^k \alpha_{j,i,k}(AT)^{k-m}(BT)T^{m-1}$$

$$U^{(m-1)}(z) + + \sum_{m=1}^{i}\sum_{k=m}^{i}\alpha_{i,j,k}(AT)^{k-m}(BT)T^{m-1}U^{(m-1)}(z)\bigg)$$

Where $U^{(p)}(z)=Z\{U^{(p)}(t)\}$. Noting that the double summation over i and m can be interchanged and recalling that $j-2 \le i \le j$ to maintain L- or A-stability, and that $u^{(p)}(t)=0$, $\forall p \le k$, shows that equation 30 can be rewritten as follows $$X^*(z) = \Bigg[(z\alpha_{j,i,0} - \alpha_{i,j,0})I + \quad (31)$$

$$(AT)\bigg(z\sum_{k=1}^{j}(-1)^k \alpha_{j,i,k}(AT)^{k-1} - \sum_{k=1}^{i}\alpha_{i,j,k}(AT)^{k-1}\bigg)\Bigg]^{-1}$$

$$\Bigg[\sum_{m=1}^{i}\bigg(-z\sum_{k=m}^{j}(-1)^k \alpha_{j,i,k}(AT)^{k-m}(BT)T^{m-1}$$

$$U^{(m-1)}(z) + + \sum_{k=m}^{i}\alpha_{i,j,k}(AT)^{k-m}(BT)T^{m-1}U^{(m-1)}(z)\bigg)\Bigg]$$

Distributing the inverted matrix between the square brackets to the summation over m, and by direct analogy with the analysis of the previous subsection X*(z) can be written as the following summation $$X^*(z) = \sum_{m=0}^{k} X_m(z) \quad (32)$$

Where $$X_m^*(z) = -\Bigg[\bigg(z\sum_{k=0}^{m-1}(-1)^k \alpha_{j,i,k}(AT)^k - \quad (33)$$

$$\sum_{k=0}^{m-1}-\alpha_{i,j,k}(AT)^k\bigg) + +(AT)^m(zH_m(AT) - L_m(AT))\Bigg]^{-1} +$$

$$(AT)^m(zH_m(AT) - L_m(AT))\Bigg]^{-1}$$

$$(zH_m(AT) - L_m(AT))(BT)T^{m-1}U^{(m-1)}(z)$$

With the polynomial matrices $H_m(AT)$ and $L_m(AT)$ being redefined as follows $$H_m(AT) := \sum_{k=m}^{j}(-1)^k \alpha_{j,i,k}(AT)^{k-m} \quad (34)$$

$$L_m(AT) := \sum_{k=m}^{i}\alpha_{i,j,k}(AT)^{k-m} \quad (35)$$

Thus, equations 32 and 33 describe a DTM for the CTM represented by the state-space matrices [A, B, C, D] obtained using the discretization method with order (i, j, k) where the derivatives of the inputs up to order k are non-vanishing. Notice that matrices $(AT)^m$ and $L_m(AT)$ commute, hence, $((AT)^m L_m(AT) - L_m(AT)(AT)^m) = 0$. Then, the DTM of equation 32 can be represented by a parallel connection of k systems according to equation 33 whose state-space matrices $[A_{dm}, B_{dm}, C_{dm}, D_{dm}]$ are given by $$A_{dm} = L_m(AT)H_m^{-1}(AT) - Q_m(AT)G_m^{-1}(AT) \quad (36)$$

$$B_{dm} = Q_m(AT)G_m^{-1}(AT)H_m(AT)(BT) \quad (37)$$

$$C_{dm} = G_m^{-1}(AT) \quad (38)$$

$$D_{dm} = -G_m^{-1}(AT)H_m(AT)(BT) \quad (39)$$

Where $$G_m(AT) = \sum_{k=0}^{m-1} \alpha_{j,i,k}(AT)^k + (AT)^m H_m(AT) \quad (40)$$

$$Q_m(AT) = \sum_{k=0}^{m-1} -\alpha_{i,j,k}(AT)^k + \sum_{k=0}^{m-1} (-1)^k \alpha_{j,i,k} L_m(AT) H_m^{-1}(AT)(AT)^k \quad (41)$$

Recalling that $$X^*_m(z) := D_{dm} + C_{dm}(zI - A_{dm})^{-1} B_{dm} U^{(m)}(z) \quad (42a)$$

Or in its discrete sequence form $$w_m(n+1,T) = A_{dm} w_m(n,T) + B_{dm} u(n,T)$$

$$x^*_m(n,T) = C_{dm} w_m(n,T) + D_{dm} u(n,T) \quad (42b)$$

Thus, the corresponding CTM approximate outputs (which are the system outputs at the sample times) can be written as follows:

$$Y(z) := DU(z) + C \sum_{m=0}^{k} X^*_m(z) \quad (43a)$$

Or equivalently $$y(k, T) := Du(k, T) + C \sum_{m=0}^{k} x^*_m(k, T) \quad (43b)$$

Thus, the z-domain transfer function can be rewritten for the DTM representation as a function of the matrices $[A_{dm}, B_{dim}, C_{dm}, D_{dm}]$ as $$Y(z) := DU(z) + C \sum_{m=0}^{k} (D_{dm} + C_{dm}(zI - A_{dm})^{-1} B_{dm} U^{(m)}(z)) \quad (44)$$

Equations 36-39 and 44 thus provide a general rule to map a state-space CTM into an equivalent state-space DTM using a high-order and high-derivatives discretization method.

FIG. 4 illustrates CTM to DTM mapping and a method of computing the output signals at the sampling time y(nT) for a high order inputs system. System 400 shows that the DTM can be realized as a parallel combination of k structures of zero-order DTMs 406a, 406b, 406c where the output of each zero-order DTM (0 to n) is summed 408. The values computed by the summation 408 are the value x(nT) of the state vector X(z) at the sampling time and can be estimated from the value u(nT) of the inputs U(z) and the values $u^{(k)}$(nT) of its k derivatives $u^{(k)}$(z) at the sampling time. The value y(nT) of the outputs Y(z) at the sampling time can be computed from the values of x(nT), u(nT), $u^{(k)}$(nT), the CTM matrices C 402 and D 404, and the summation 410. Differently than other methods, the produced DTM is capable of high-order discretization, is unconditionally stable and its complexity grows linearly with the order of the approximation.

Figure 5:
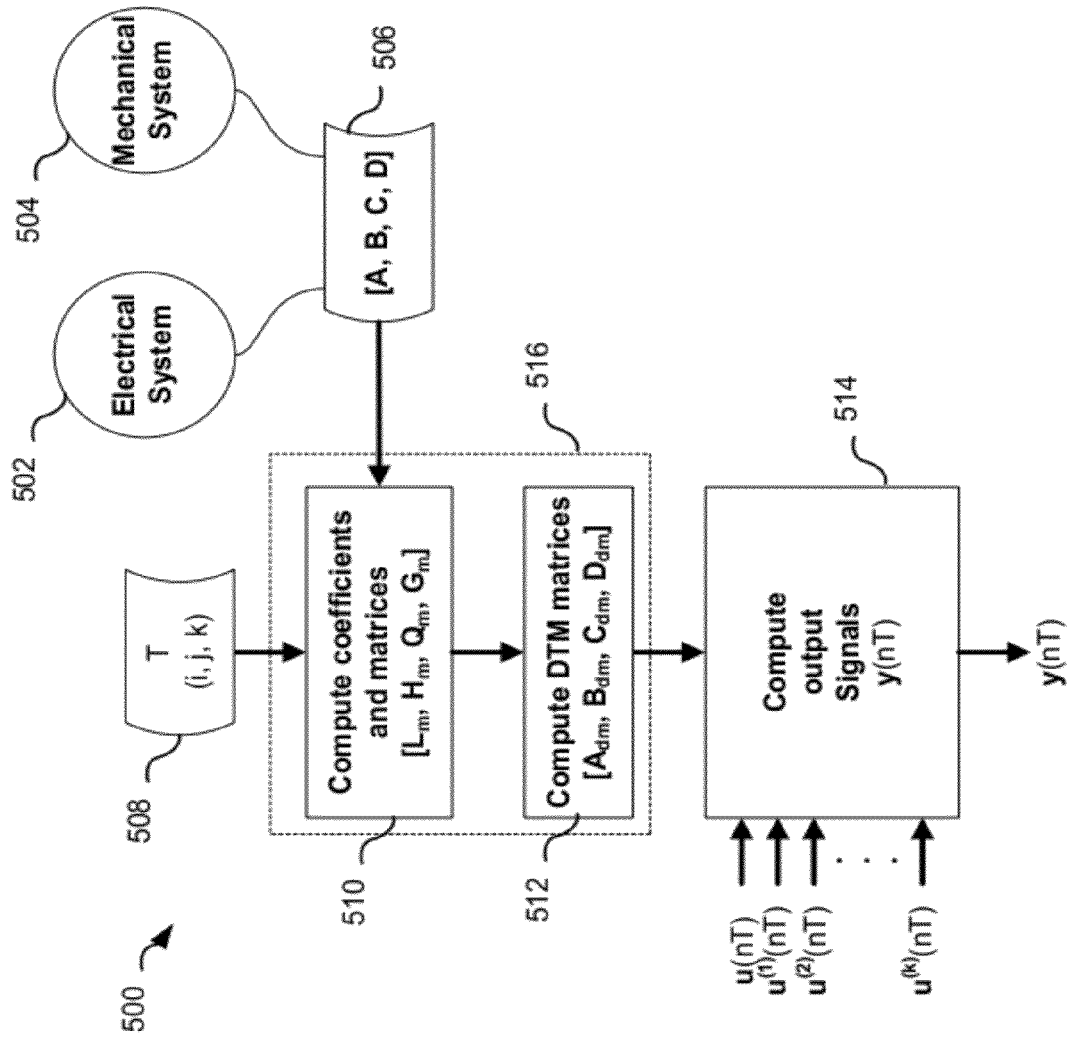
FIG. 5 shows a system representation of a high level view of a high-order and high-derivatives and unconditionally stable method to discretize a CTM into a high accuracy and unconditionally stable DTM.

FIG. 5 illustrates a system representation of a high level view of a high-order and high-derivatives system 500 to discretize a CTM into a high accuracy and unconditionally stable DTM as provided for example by DTM computation block 128 and output computation block 129. The system 500 receives a set of parameters comprising of the state space formulation [A, B, C, D] 506 describing the representation of a continuous-time system such as electrical system 502 or mechanical system 504, and the sampling time T and the order of the approximation [i, j, k] 508 and computes the value y(nT) of the outputs 514 at the sampling time. The method of computing the equivalent DTM 516 refers to the DTM computation block 128 comprising the method of computing the Obreshkov coefficients and matrices 510 and the method of computing the DTM matrices $[A_{dm}, B_{dm}, C_{dm}, D_{dm}]$ 512.

Figure 6:
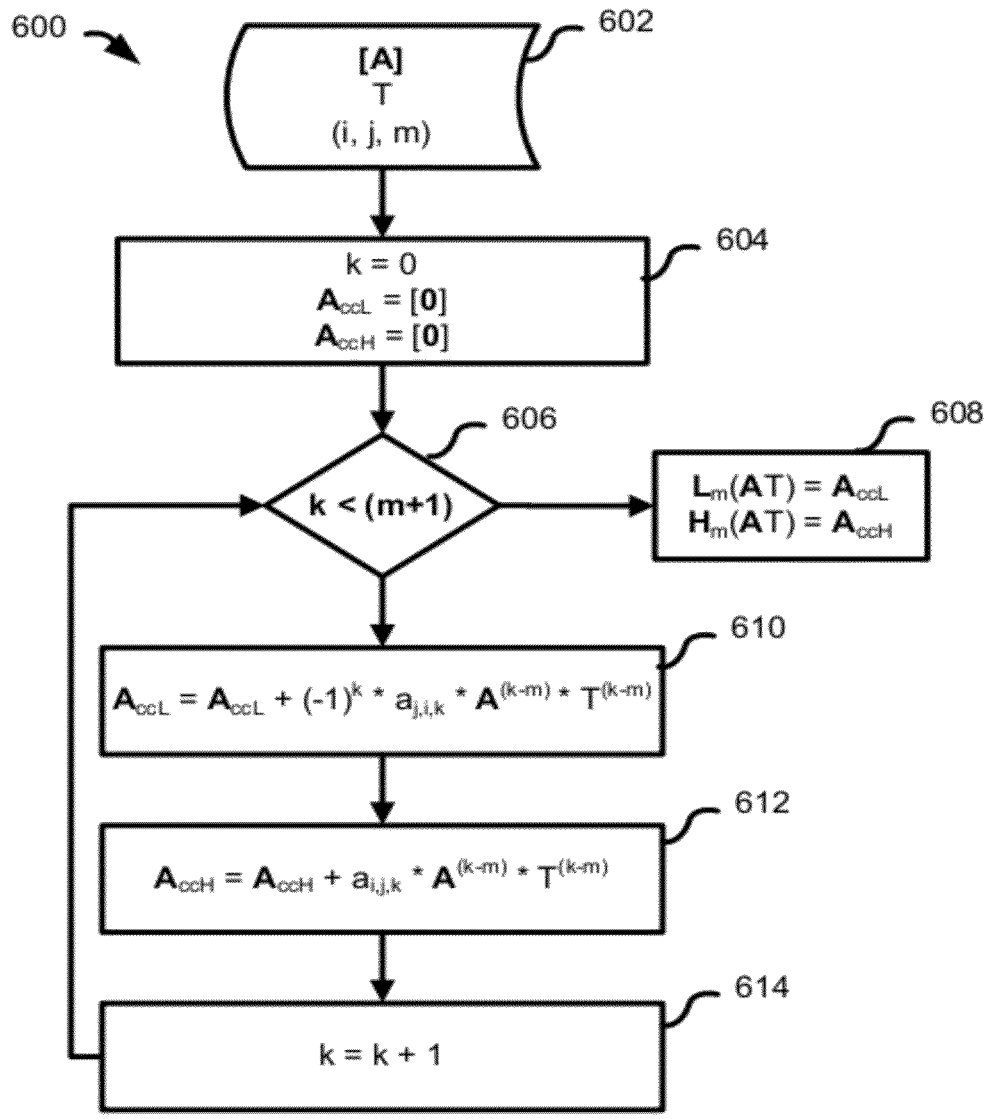
FIG. 6 shows a representation of a flowchart of a method of computing the [$L_m$, $H_m$] of the method shown in FIG. 5.

The method of computing coefficients and matrices 510 shown in the exemplary flowchart 600 of FIG. 6 to compute equations 34 and 35 receives a state matrix A, the sampling time T and the order of the approximation [i, j, m] of (602) and computes the Obreshkov IF coefficients and matrices $[L_m, H_m]$ (608). The increment variable k is initially set to zero and the two initial auxiliary variables AccL and AccH (604) to store the accumulated value of the polynomial matrices $[L_m, H_m]$ respectively. The auxiliary variables (610) and (612) are accumulated as the variable k is incremented (614) until it reaches the value of the Obreshkov parameter m (606). The resulting $L_m(AT)$ and $H_m(AT)$ results (608) are stored in a memory and passed to a process implementing computing the DTM matrices $[A_{dm}, B_{dm}, C_{dm}, D_{dm}]$ (512).

Figure 7:
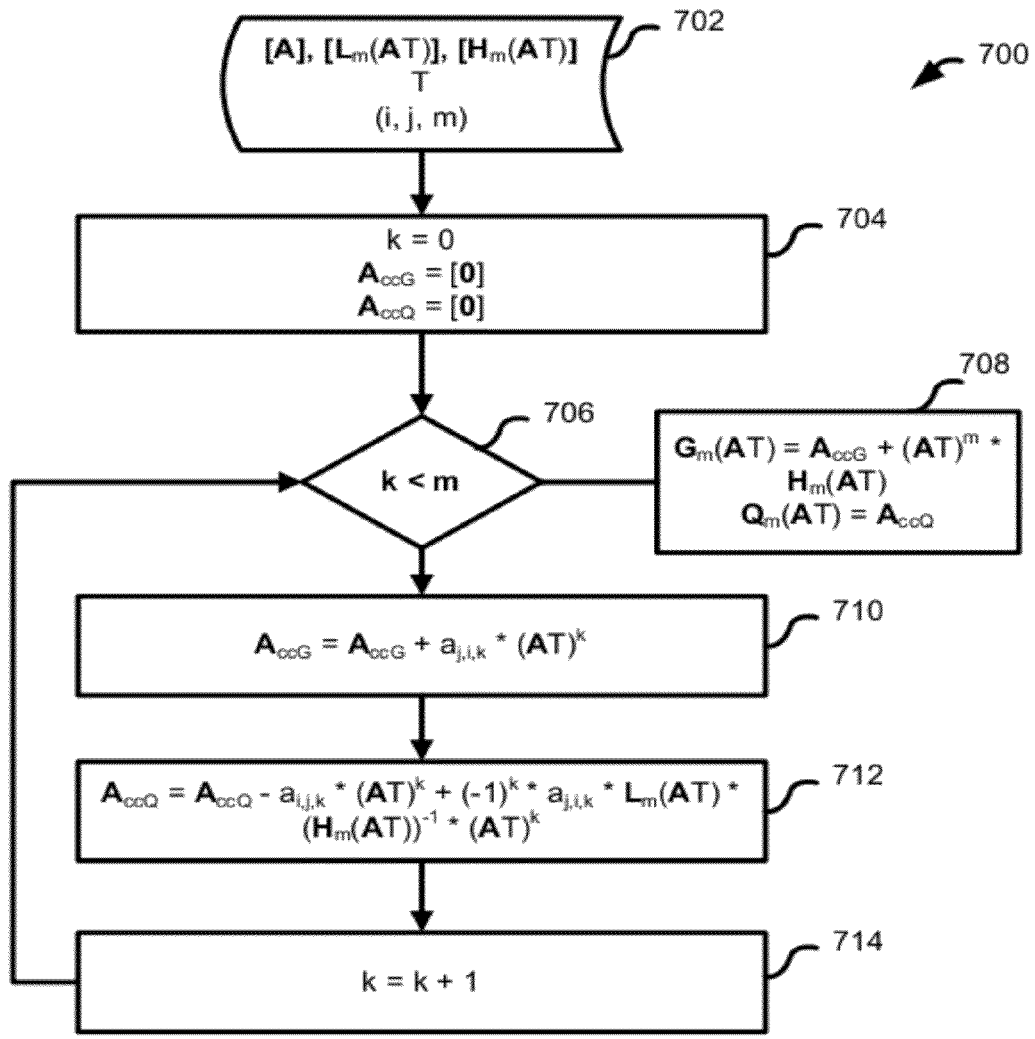
FIG. 7 shows a representation of a flowchart of a method of computing the [$Q_m$, $G_m$] of the method shown in FIG. 5.

The method of computing coefficients and matrices 510 shown in the exemplary flowchart 700 of FIG. 7 to compute equations 36-39 receives CTM matrices A and B, the sampling time T and the order of the approximation [i, j, m] (702), and the polynomial matrices $[L_m, H_m]$ (608) and computes the Obreshkov IF coefficients and matrices $[G_m, Q_m]$ (708). The increment variable k is initially set to zero and the two initial auxiliary variables AccL and AccH to store the accumulated value of the polynomial matrices $[G_m, Q_m]$ (704) respectively. The auxiliary variables (710) and (712) are accumulated as the variable k is incremented (714) until it reaches the value of the Obreshkov parameter m (706). The resulting $G_m(AT)$ and $Q_m(AT)$ results (708) are stored in a memory and passed to a process implementing computing the DTM matrices $[A_{dm}, B_{dm}, C_{dm}, D_{dm}]$ 512.

Figure 8:
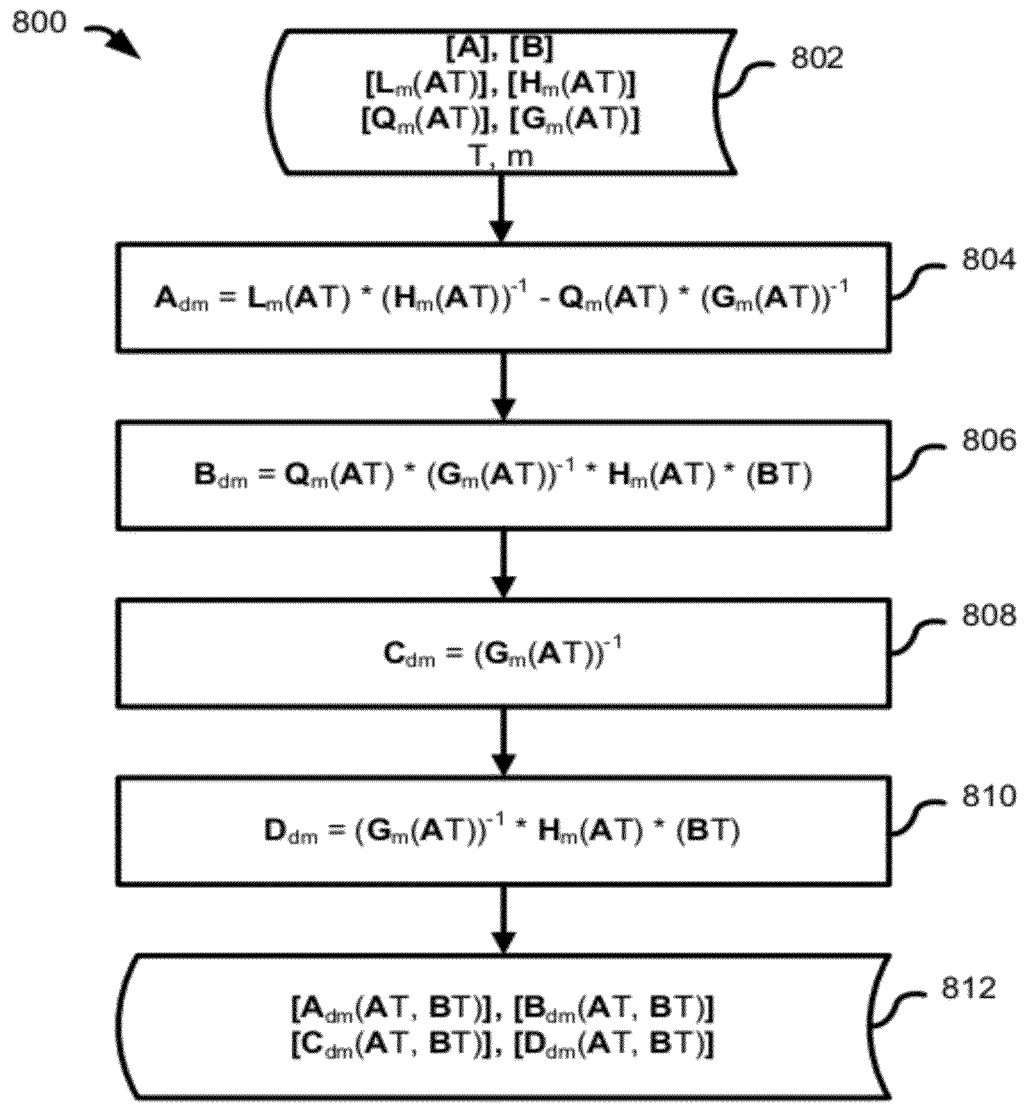
FIG. 8 shows a representation of a flowchart of a method of computing the [$A_{wm}$, $B_{wm}$, $C_{wm}$, $D_{wm}$] of the method shown in FIG. 5.

The method of computing coefficients and matrices shown in the exemplary flowchart 800 of FIG. 8 to compute equations 40 and 41 receives CTM matrices A and B, the polynomial matrices $[L_m, H_m, G_m, Q_m]$ (608) and (708), the sampling time T and the Obreshkov parameter m (802), and computes the Obreshkov IF matrices $A_{dm}$ (804), $B_{dm}$ (806), $C_{dm}$ (808), and $D_{dm}$ (810). The resulting $[A_{dm}, B_{dm}, C_{dm}, D_{dm}]$ results (812) are stored in a memory or can be passed directly to the method 900 (related to a ASP 129) to compute the outputs 110.

Figure 9:
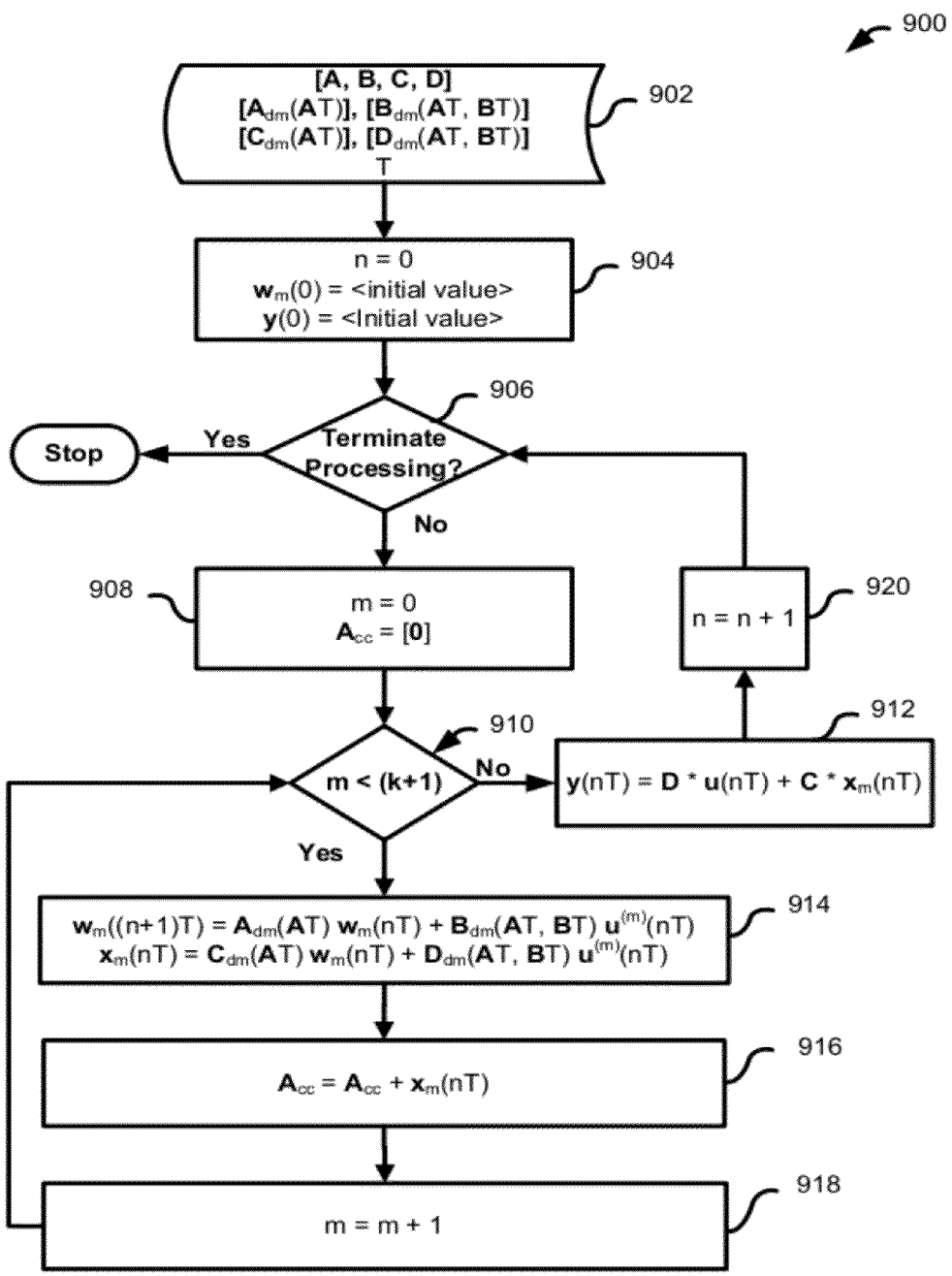
FIG. 9 shows a representation of a flowchart of a high-order and high-derivatives discretization method of computing the outputs of a CTM at the sample times.

The method of computing output signals 514 shown in the exemplary flowchart 900 of FIG. 9 to compute equation 44 receives a CTM matrices [A, B, C, D], a sampling time T, a DTM matrices $[A_{dm}, B_{dm}, C_{dm}, D_{dm}]$, a value u(nT) of the inputs and a values $u^{(k)}$(nT) of its k derivatives (902) and computes the value y(nT) of the outputs at the sampling time of (912). The increment variable n is initially set to zero and the two auxiliary variables y(0) and $w_n$(0) to store the output signal sequence and the internal state variable are initiated to an initial value (904). At the beginning of the computing cycle of the next values of the output signals (912) the increment variable m and the auxiliary variable $A_{cc}$ are set to zero (908). The auxiliary variables (914) and (916) are accumulated as the variable m is incremented (918) until it reaches the value of the Obreshkov parameter k (910). The resulting y(nT) results (912) are stored in memory or passed directly as the outputs 110. If there are still input signals 102 to be processed and the processing has not been terminated by the user or by a monitoring processor (906), the increment variable n is incremented and the computing cycle for the next output signals resumes (908).

Once the order of the approximation given by the parameters (i, j, k) has been selected and the discrete-time state-space matrices (equations 20-23 or 36-39) have been obtained, the accuracy and stability of the equivalent DTM is validated.

Figure 10:
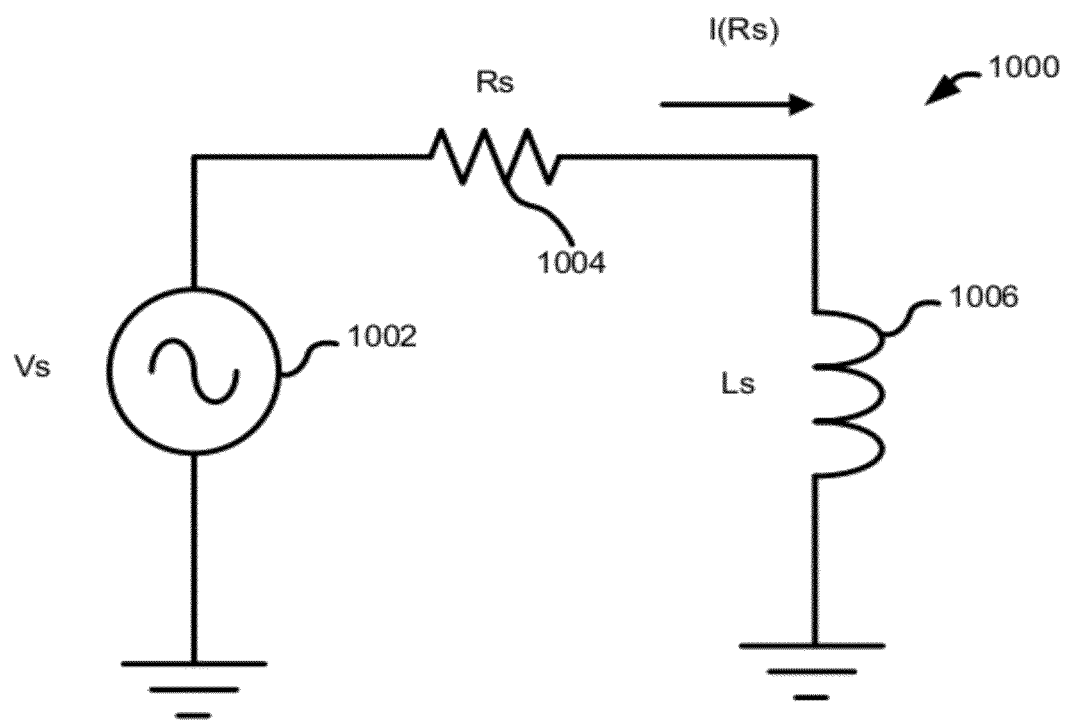
FIG. 10 shows the electrical circuit of an RL circuit.
Figure 11:
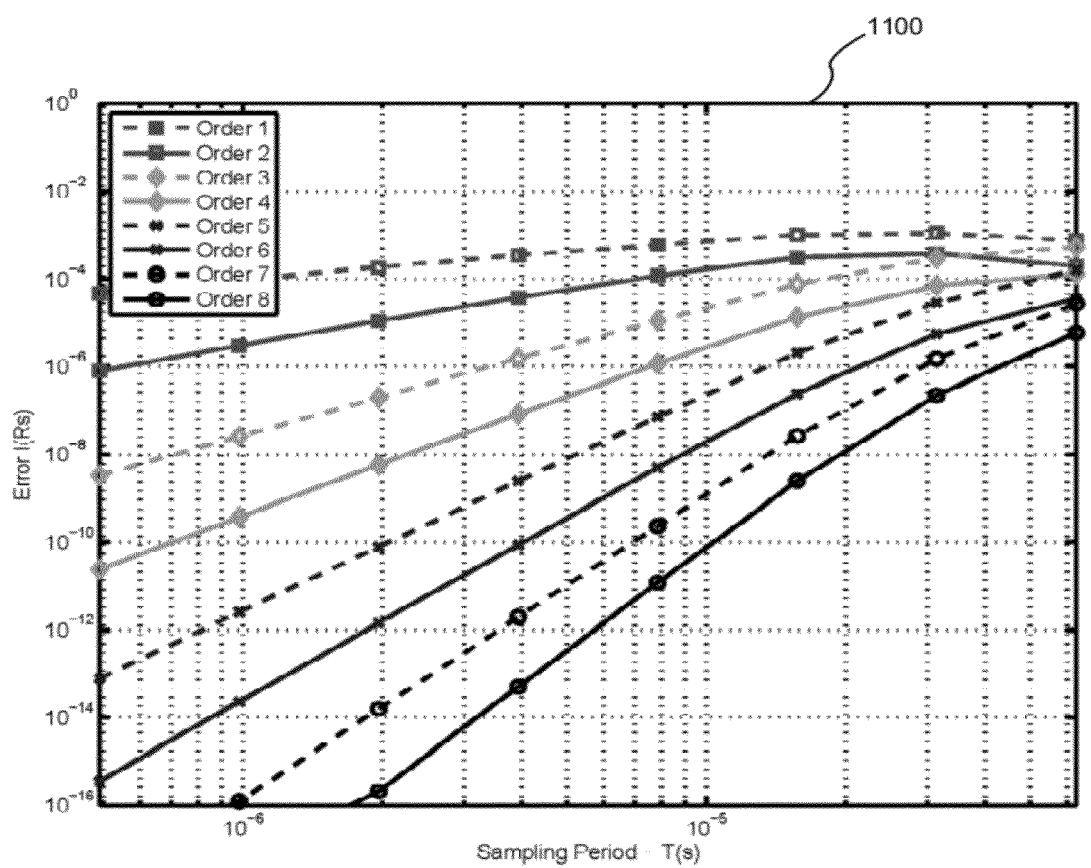
FIG. 11 shows plots illustrating accuracy as a function of the sampling period for a first order RL circuit subjected to a non-forced input.
Figure 12:
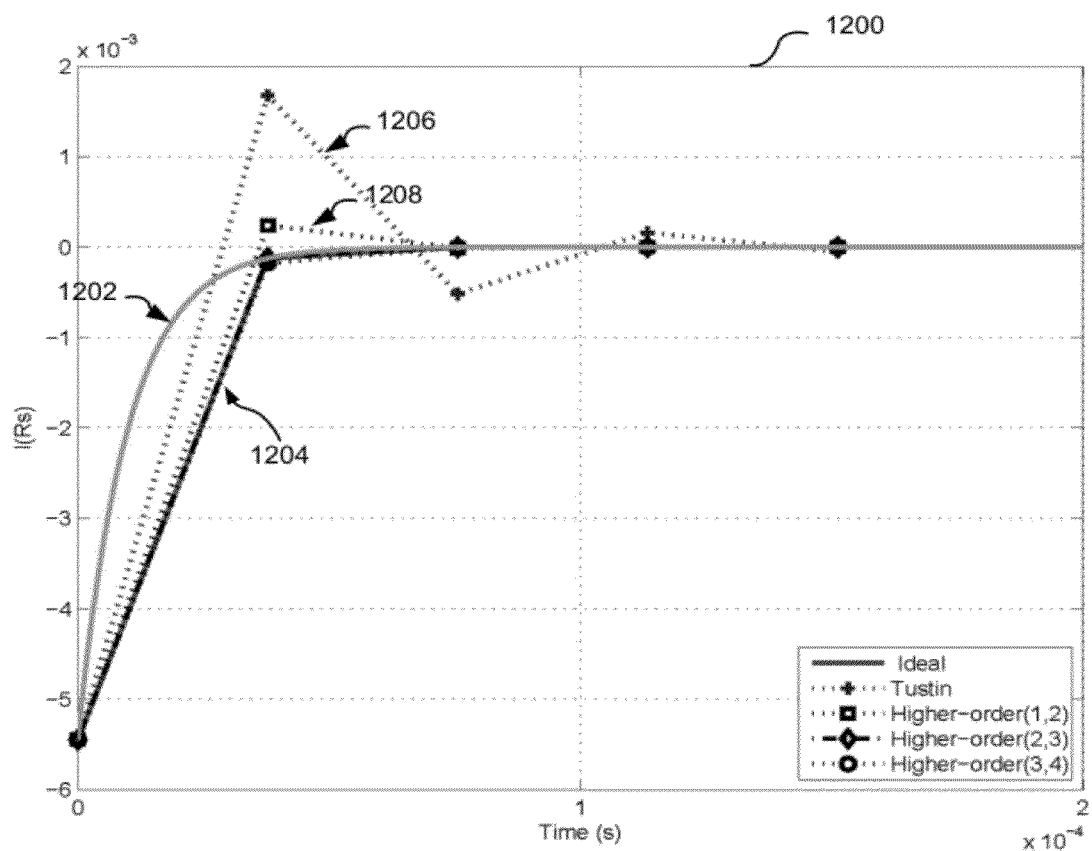
FIG. 12 shows plots illustrating the real-time dependence (transient simulation) of the DTM equivalent of a first order RL circuit subjected to a non-forced input.

The first set of examples aims at demonstrating the performance of the disclosure by comparing the transient and frequency response of the discretized RL circuit 1000 of FIG. 10 with the theoretical transient and frequency response of this circuit, which can be found using well-known analytical methods. The error between the non-forced transient response (setting Vs=0) of the disclosure and the theoretical (exact) non-forced transient response plot 1100 of the RL circuit is in FIG. 11 for various orders. The RL circuit 1000 illustrates a first order electrical circuit comprising a voltage source Vs 1002, a resistor Rs 1004 and an inductance Ls 1006. As shown by this example, increasing the order causes the error to decrease faster with a reduction of the sampling time than lower order approximations. FIG. 12 shows a plot 1200 of the non-forced transient response of the RL circuit where the curve 1202 represents the theoretical continuous-time response of the original CTM and curve 1204 is the exact response for a sampling period T=3.78e−8 s. As shown, the curve obtained by the Tustin method 1206 (which is obtained by setting (i, j, 0)=(1, 1, 0)) shows an oscillatory behavior just after the transition. This behavior is the result of the Tustin method not being L-stable (although it is A-stable). It can also be seen the curve produced by the higher-order approximations 1208 damp the numerical oscillation faster. Indeed, the results for order higher than three do not show any oscillation at all. Afterwards, the voltage source Vs 1002 was used to apply a forcing stimulus at the input of the model. The behavior of the discretization method has been validated under sinusoidal and under step input conditions.

Figure 13:
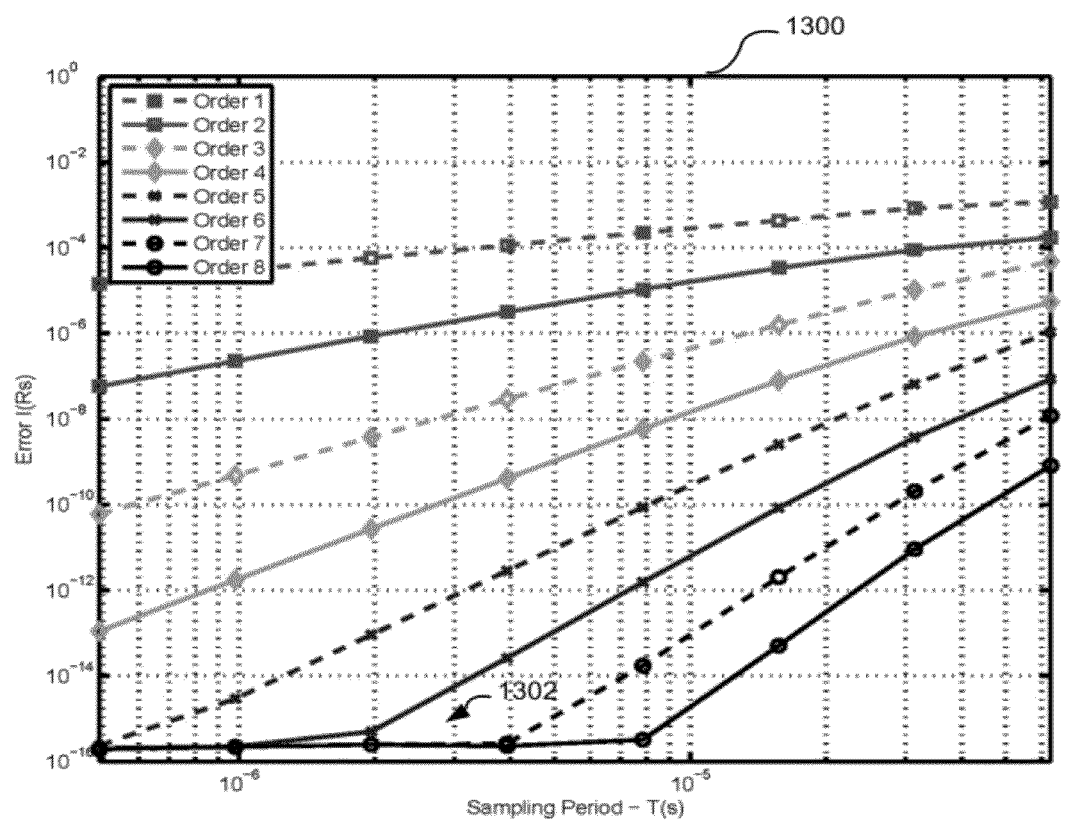
FIG. 13 shows plots illustrating accuracy as a function of the sampling period for a first order RL circuit subjected to a sinusoidal input.

The maximum error versus the sampling period for sinusoidal input plot 1300 is shown in FIG. 13. It is important to note from this figure that, for very high order and small sampling period the discretization error approaches the level of the machine accuracy and, thus, it naturally saturates 1302.

Figure 14:
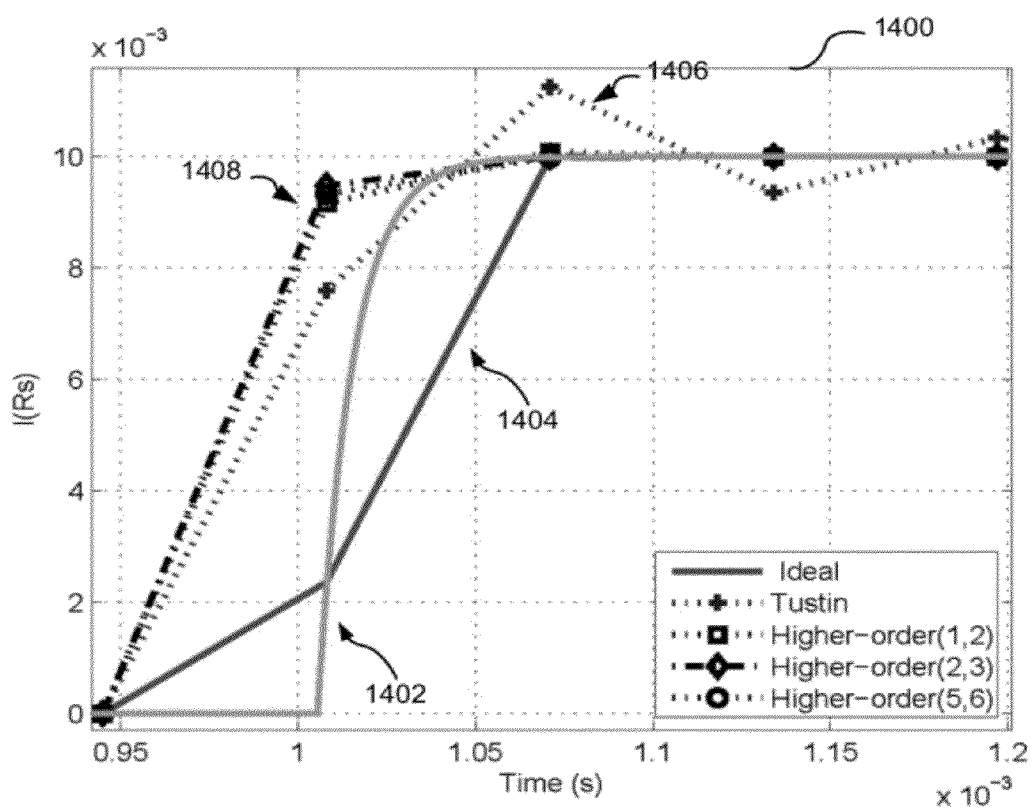
FIG. 14 shows plots illustrating the real-time dependence (transient simulation) of the DTM equivalent of a first order RL circuit subjected to a step input.

FIG. 14 shows a plot 1400 of the transient response of the RL circuit 1000 to a step input where curve 1402 is the continuous-time response of the original CTM and curve 1404 is the exact response for a sampling period T=3.78e−8 s. Similarly to FIG. 12, it should be noticed the numerical instability introduced by the Tustin method and shown by curve 1406 takes significantly longer to vanish whereas in the higher-order method of curve 1408 it is damped immediately after the step transition.

The second set of examples aims to demonstrate the performance of the method by comparing its transient and frequency response to an example filter that has been previously reported in the literature and to which the performance under existing methods is well known. The example filter is the fifth-order continuous-time filter with transfer function given by $$F(s) = \frac{1152(s+0.5)(s+1.5)}{(s+1)(s+2)(s+4.5)(s+8)(s+12)} \quad (45)$$

The discretization of the filter of equation 45 has been extensively studied and the respective results have been reported in the literature for a sampling period T=0.01 s considered an ideal sampling period in the sense that it is small enough to reduce the approximation error.

Figure 15:
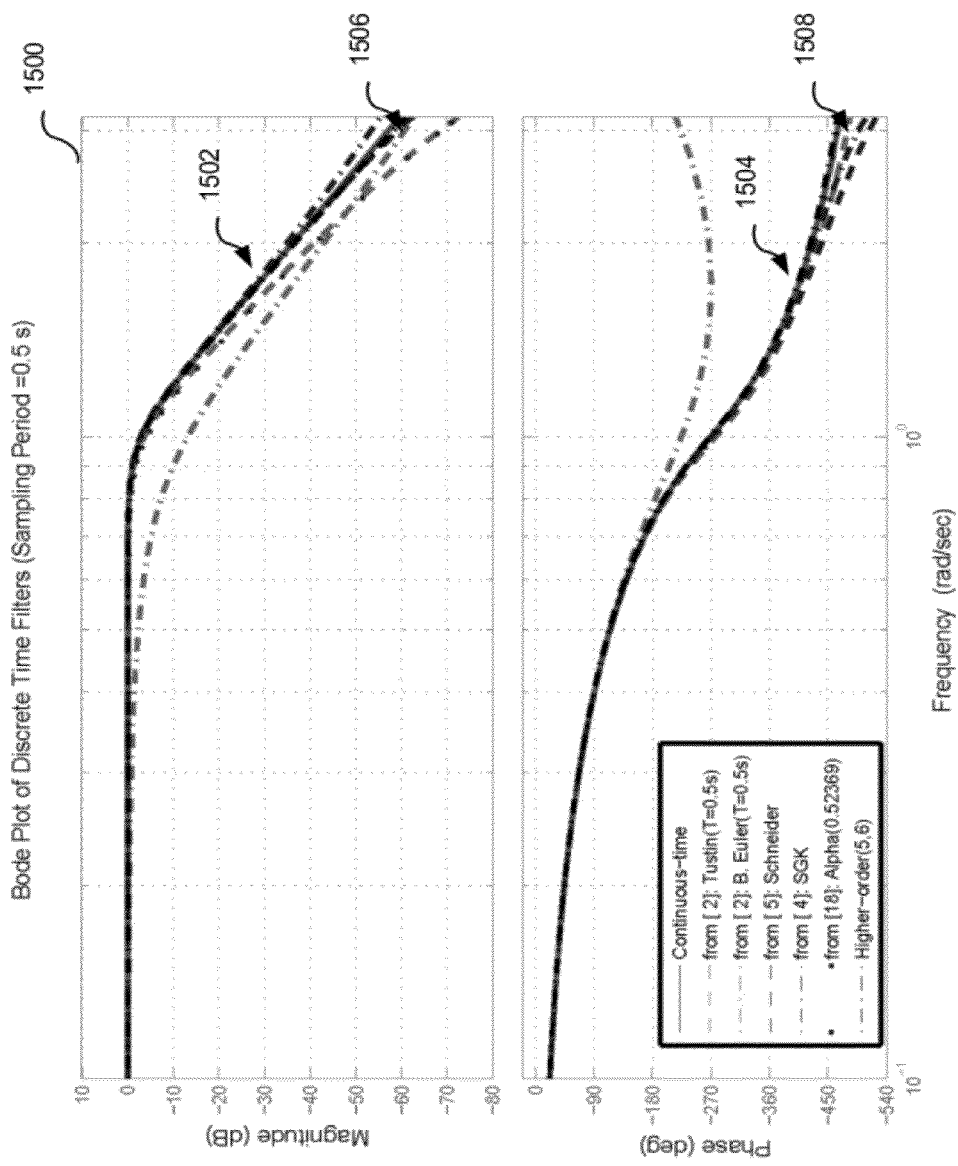
FIG. 15 shows the frequency dependence of a sixth order Butterworth analog filter for a sampling period of 0.5 s.

FIG. 15 shows the frequency response of existing methods, together with the result for the higher-order configured with (i, j, 0)=(5, 6, 0) plot 1500. As it can be seen, for a sampling period T=0.01 s some of the existing methods produce an acceptable approximation for the gain 1502 or for the phase response 1504, but not for both at the same time. It should be noticed that the higher-order method produces the smallest error among all the methods tested for the gain 1506 and for the phase response 1508 at the same time.

Figure 16:
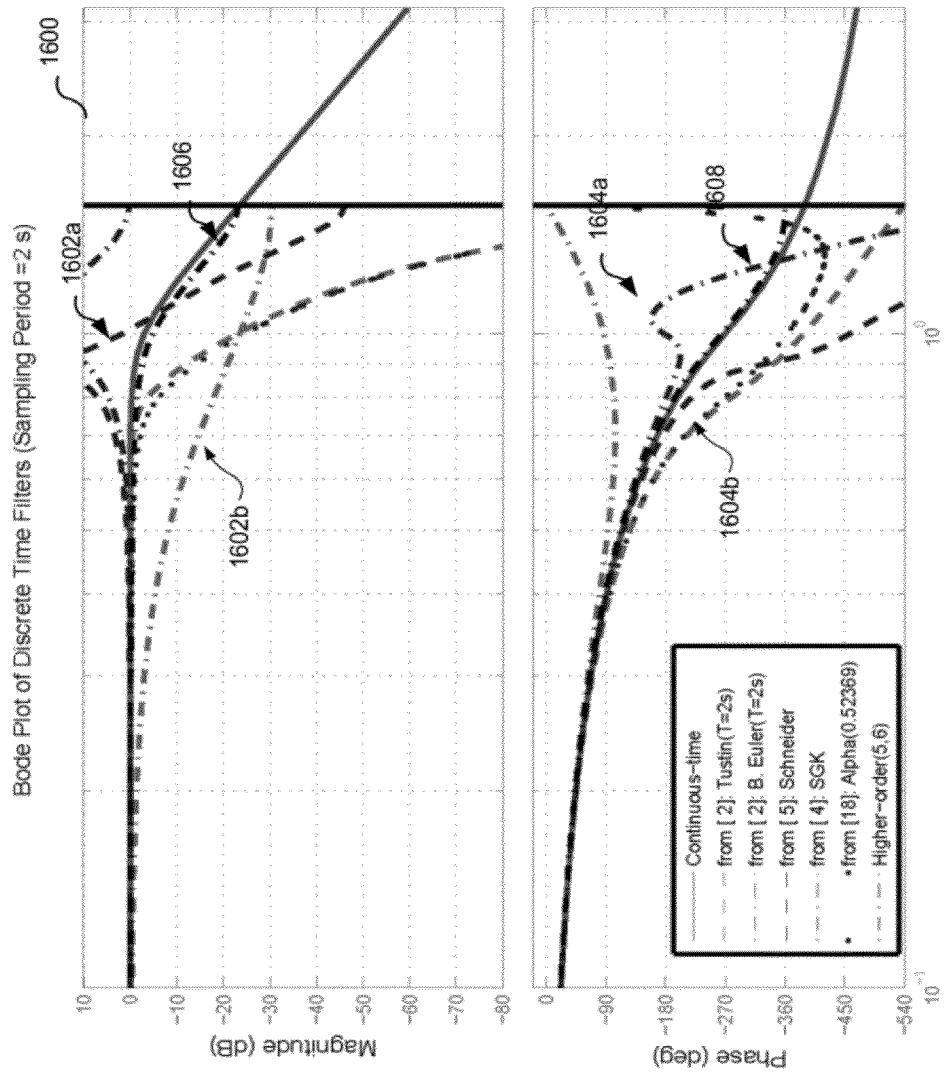
FIG. 16 shows the frequency dependence of a sixth order Butterworth analog filter for a sampling period of 2.0 s.

FIG. 16 shows a plot 1600 the frequency response of the methods of where the sampling period has been increased to T=0.05 s. FIG. 16 makes it even more evident the superiority of the higher-order method compared to the existing methods. In this figure, the existing methods produce unacceptable results either for the gain 1602 or for the phase 1604. Nevertheless, the higher-order method is still capable of producing very good approximation for both the gain 1606 and the phase responses 1608.

Figure 17:
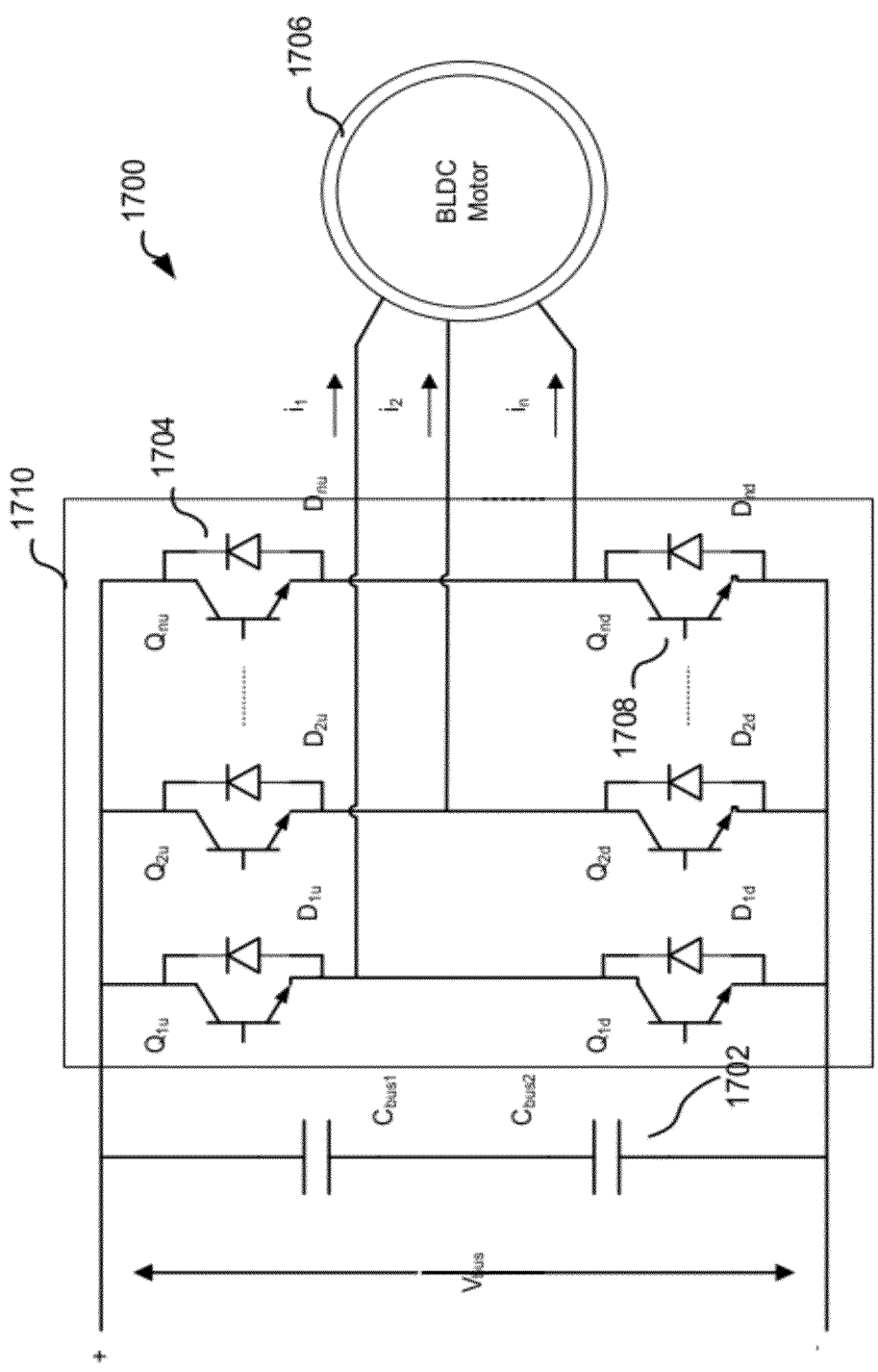
FIG. 17 shows a multiphase BLDC motor drive system.

As shown in FIG. 17, the third set of examples aims to demonstrate the performance of the disclosure in a complex nonlinear system 1700 such as the multiphase Brush-Less DC Motor (BLDCM) motor-drive system. In FIG. 17, energy is stored in capacitances $C_{bus}$ 1702 in the form of a DC voltage and transferred to the BLDC motor 1706 through the power converter 1710. By appropriately controlling the gate 1708 of the switches 1704, the energy stored in the capacitances 1702 can be controlled and transferred to the BLDC motor 1706 to make it turn. The phase-neutral model of such system for three, five and seven phases have been extensively studied and reported in the literature. For a wye-connected floating-neutral motor, the existing model can be generalized to an arbitrary number of phases. Thus, the CTM of the BLDC motor electrical circuit can be formulated in the continuous-time state-space canonical form of equation 46

$$\frac{dI(t)}{dt} = L_{pm}^{-1}\{-R_{pm}I(t) + KV(t) - KE(t)\} \quad (46)$$

Where
$V(t)=[v_1\ v_2\ \ldots\ v_n]^T$ is the phase-neutral voltage vector
$I(t)=[i_1\ i_2\ \ldots\ i_n]^T$ is the phase current vector
$E(t)=[e_1\ e_2\ \ldots\ e_n]^T$ is the phase bemf voltage vector
$R_{pm}$, $L_{pm}$ and K are the motor resistance matrix, the motor inductance matrix and an n×n constant matrix respectively given by $$R_{pm} = \begin{bmatrix} R_1 & 0 & 0 & \ldots & 0 \\ 0 & R_2 & 0 & \ldots & 0 \\ 0 & 0 & R_3 & \ldots & 0 \\ \ldots & \ldots & \ldots & \ldots & \ldots \\ 0 & 0 & 0 & \ldots & R_n \end{bmatrix} \quad (47)$$

$$L_{pm} = \begin{bmatrix} L_1 & M_{12} & M_{13} & \ldots & M_{1n} \\ M_{21} & L_2 & M_{23} & \ldots & M_{2n} \\ M_{31} & M_{32} & L_3 & \ldots & M_{3n} \\ \ldots & \ldots & \ldots & \ldots & \ldots \\ M_{n1} & M_{n2} & M_{n3} & \ldots & L_n \end{bmatrix} \quad (48)$$

-continued $$K = \begin{bmatrix} (n-1) & -1 & -1 & \ldots & -1 \\ -1 & (n-1) & -1 & \ldots & -1 \\ -1 & -1 & (n-1) & \ldots & -1 \\ \ldots & \ldots & \ldots & \ldots & \ldots \\ -1 & -1 & -1 & \ldots & (n-1) \end{bmatrix} \quad (49)$$

It is important to notice the existing models of equations 46-49 are valid only if the assumption that the motor is mechanically symmetrical and the system is balanced on the electrical machine phase voltages is true. Nevertheless, these two assumptions do not hold for high accuracy applications or in case of analysis of the system behavior under faulty scenarios. Different than the existing CTM formulation, the new phase-phase formulation of equation 50 do not require neither the motor to be mechanically symmetrical nor the system to be balanced on the electrical machine phase voltages, or, in other words, it is valid even in the case these two assumptions hold.

$$\frac{dI(t)}{dt} = L_{pp}^{-1}\{-R_{pp}I(t) + U_{pp}(t)\} \quad (50a)$$

Or in canonical state-space form:

$$\frac{dI(t)}{dt} = A_{pp}I(t) + B_{pp}U_{pp}(t) \quad (50b)$$

Where
$I(t) = \lfloor i_1 \ i_2 \ \ldots \ i_{n-1} \rfloor^T$ is the phase current vector
$V_{pp}(t) = \lfloor v_{1,2} \ v_{2,3} \ \ldots \ v_{n-1,n} \ v_{n,1} \rfloor^T$ is the phase-phase voltage vector such that $v_{i,j} = v_i - v_j$
$E_{pp}(t) = \lfloor e_{1,2} \ e_{3,2} \ \ldots \ e_{n-1,n} \ e_{n,1} \rfloor^T$ of is the phase-phase bemf voltage vector such that $= e_{i,j} = e_i - e_j$ $A_{pp} = -L_{pp}^{-1} R_{pp}$ and $B_{pp} = L_{pp}^{-1}$ $U_{pp}(t) = V_{pp}(t) - E_{pp}(t)$ $R_{pp}$ and $L_{pp}$ are $(n-1) \times (n-1)$ square matrices given by $$R_{pp} = \begin{bmatrix} R_1 & -R_2 & 0 & \ldots & 0 \\ 0 & R_2 & -R_3 & \ldots & 0 \\ 0 & 0 & R_3 & \ldots & 0 \\ \ldots & \ldots & \ldots & \ldots & \ldots \\ R_n & R_n & R_n & \ldots & R_{n-1}+R_n \end{bmatrix} \quad (51)$$

$$L_{pp} = \begin{bmatrix} F_{1,2,1} & F_{1,2,2} & F_{1,2,3} & \ldots & F_{1,2,n-1} \\ F_{2,3,1} & F_{2,3,2} & F_{2,3,3} & \ldots & F_{2,3,n-1} \\ F_{3,4,1} & F_{3,4,2} & F_{3,4,3} & \ldots & F_{3,4,n-1} \\ \ldots & \ldots & \ldots & \ldots & \ldots \\ F_{n-1,n,1} & F_{n-1,n,2} & F_{n-1,n,3} & \ldots & F_{n-1,n,n-1} \end{bmatrix} \quad (52)$$

Where $$F_{k,m,j} = M_{k,j} - M_{m,j} - M_{k,n} + M_{m,n} \quad (53)$$

Figure 19:
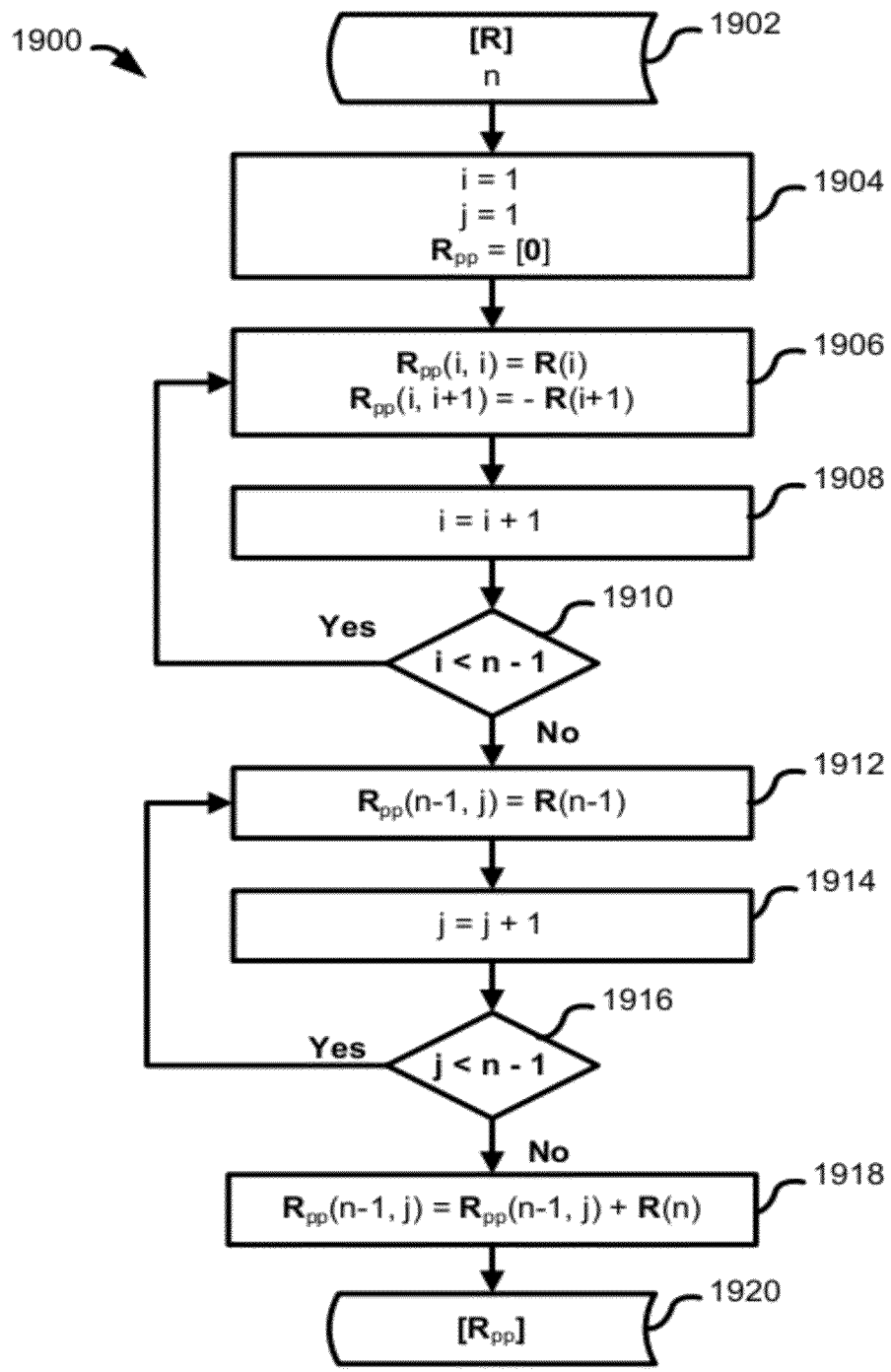
FIG. 19 shows a representation of a flowchart showing a method of computing $R_{pp}$ matrix of a BLDC motor model.
Figure 20:
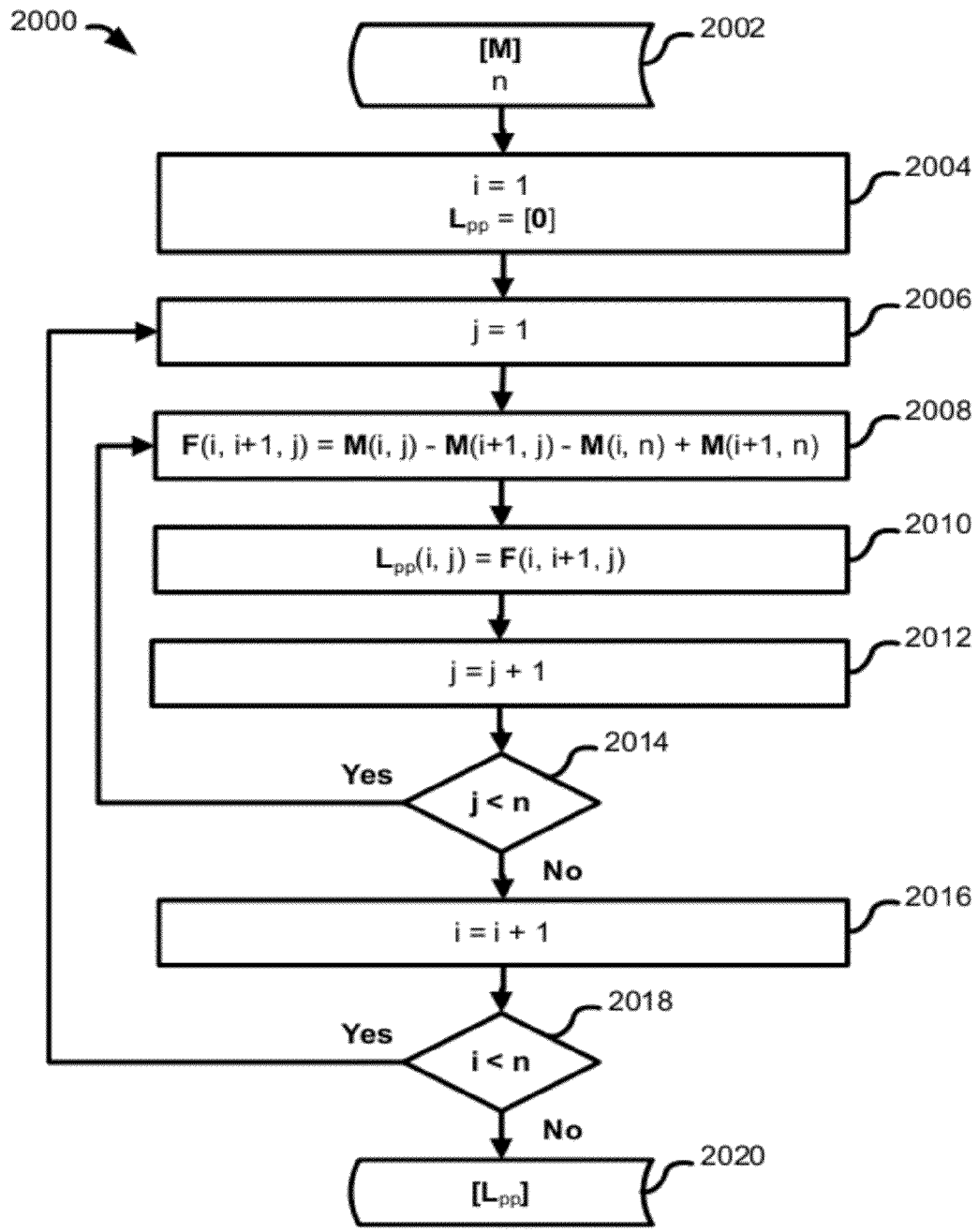
FIG. 20 shows a representation of a flowchart showing a method of computing $L_{pp}$ matrix of a BLDC motor model.
Figure 21:
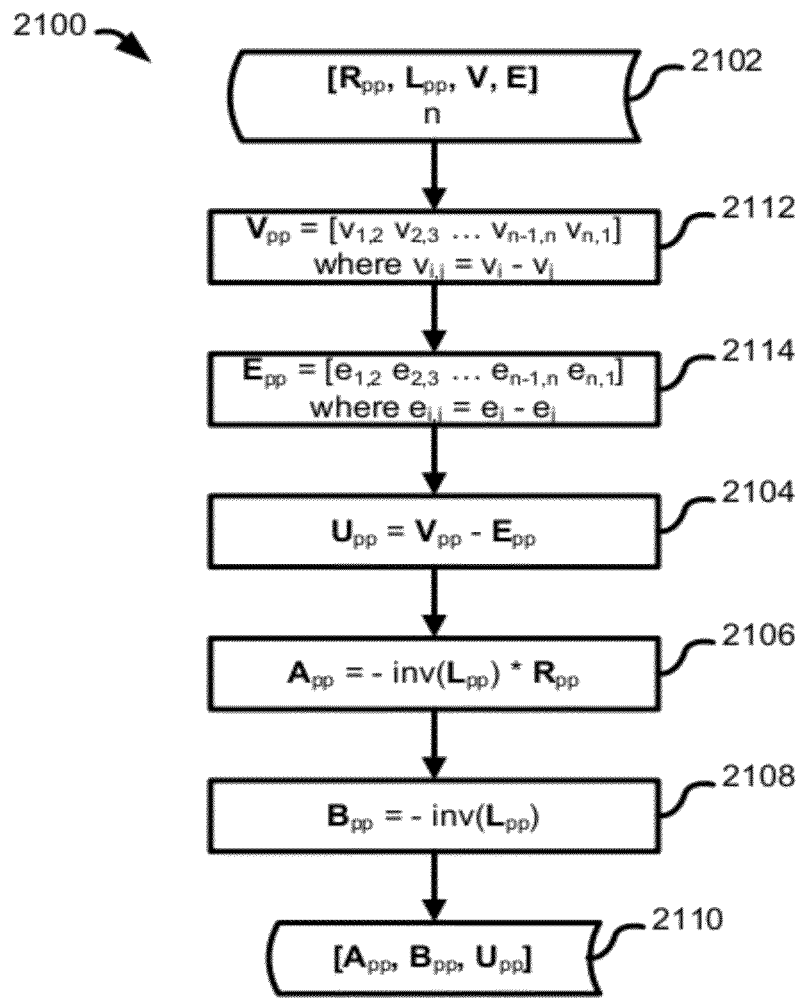
FIG. 21 shows a representation of a flowchart showing a method of computing a continuous-time electrical part model of a multiphase BLDC motor.

FIGS. 19, 20 and 21 show a representation of an exemplary flowchart showing a method of computing a continuous-time electrical part model of BLDC motor model and their $R_{pp}$ and $L_{pp}$ matrices.

The CTM of the BLDC motor mechanical part is straightforward and is given by equations 54-57

$$T_e(t) = \frac{1}{\omega_r} \sum_{k=}^{n} e_k(t) i_k(t) \quad (54)$$

$$e_k(t) = K_V |\omega_r(t)| \Gamma\left(\theta_r - \frac{k}{n} 2\pi\right) \quad (55)$$

$$\frac{d\theta_r(t)}{dt} = \omega_r(t) \quad (56)$$

$$\frac{d\omega_r(t)}{dt} = \frac{1}{J}(T_e(t) - T_L(t) - B\omega_r(t) - C|\omega_r(t)|) \quad (57)$$

Where $\Gamma(\theta_r)$ is the normalized function for permanent magnet flux, $T_L$ is the load torque, B is the friction viscous coefficient (also called damping factor), C is the Coulomb friction coefficient and $T_{eq}(t) = (T_e(t) - T_L(t) - B\omega_r(t) - C|\omega_r(t)|)$ is the disturbance torque.

Figure 18:
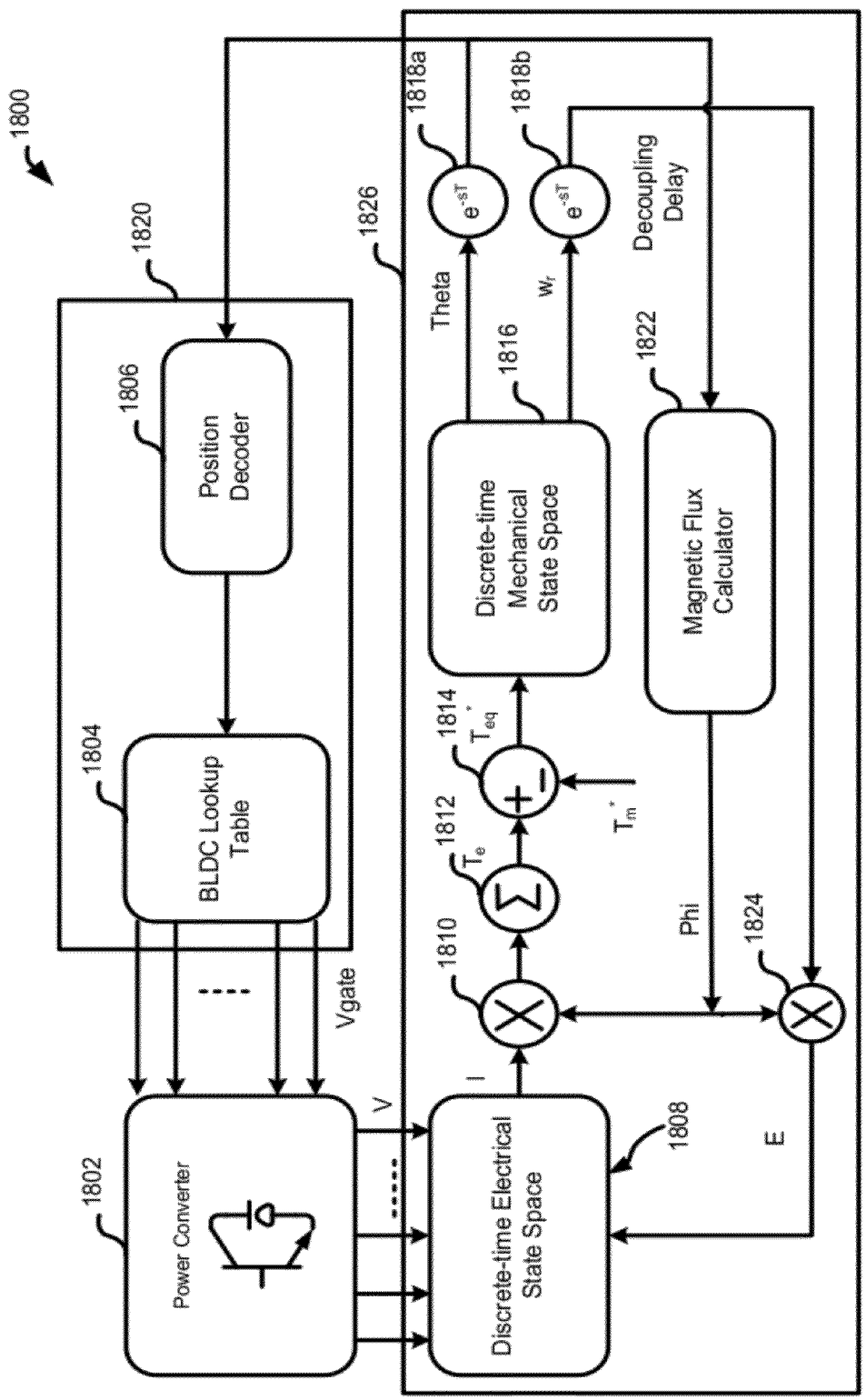
FIG. 18 shows BLDC motor drive model partitioning.

Looking at equations 54-57, it can be seen that the electrical and mechanical state spaces are coupled to each other over the magnetic flux. The nonlinear nature of the normalized magnetic flux requires the system matrix to be inverted during simulation consuming a significant amount of the computation time. In order to avoid inverting the matrix, it was chosen to decouple the system model over the mechanical variable $(\theta_r(t), \omega_r(t))$ introducing one timestep delay as shown in FIG. 18. The mechanical and the electrical state-space CTMs of equations 50 and 57 are then discretized using the method described in the current disclosure and the resulting DTMs were implemented in a computer program.

The BLDC motor drive model partitioning of 1800 shown in FIG. 18 comprises a power converter model 1802, a position sensor 1820 and a BLDC discrete-time model 1826. The position decoder block 1806 receives the position of the BLDC motor shaft, encodes it and sends the code to the BLDC lookup table 1804 which decodes this information to decide which gate 1708 of the power converter 1802 switches 1704 must be turned on or turned off in order to ensure the proper functioning of the BLDC motor model 1826. The one sampling time decoupling delays of 1818 allow the magnetic flux calculator block 1822 to compute a non linear magnetic flux Phi for each phase of the BLDC motor using the shaft angular position Theta calculated during the previous sampling time. The magnetic flux calculator block can be implemented by a lookup table or a function implementing for example a trapezoid, a sinus or another function to approximate the dependence of the magnetic flux with the angular position. The magnetic flux Phi 1822 multiplied by the angular speed $\omega_r$ computed during the previous sampling time produces the BEMF voltage E for each motor phase. The discrete-time electrical state space block 1808 receives the phase voltages V from the power converter model 1802 and the back electromotive force (BEMF) E from 1824 and computes the phase currents I by using equation 50. The resulting of the product 1810 of current I 1808 by the magnetic flux Phi 1822 is summed 1812 to produce the electrical torque $T_e$. The discrete-time mechanical state space block 1816 receives the equivalent torque $T_{eq}$ 1814 obtained by subtracting $T_e$ minus $T_m$ such that $T_m(t) = T_L(t) + B\omega_r(t-T) + C|\omega_r(t-T)|$ to produce the angular speed $\omega_r$ and angular position Theta at the current sampling time. The mechanical DTM 1816 is obtained by applying the discretization method of this disclosure on the mechanical CTM of equations 56-57. The electrical DTM 1808 is obtained by applying the discretization method of this disclosure on the electrical CTM of equations 50-53.

A method of computing the $R_{pp}$ matrix used in the electrical DTM 1808 is shown in the exemplary method flowchart 1900 of FIG. 19 to compute equation 51 for a multi-phase BLDC motor receives the phase resistance matrix R and the number of phases n (1902), and computes the $R_{pp}$ matrix (1920). The increment variables i and j, and the $R_{pp}$ matrix are initially set to zero (1904). The elements of matrix R are assigned to the elements of the $R_{pp}$ matrix (1906) as the variable i is incremented (1908) until it reaches (n−2) (1910). Then the remaining elements of matrix R are assigned to the last row of the $R_{pp}$ matrix (1912) as the variable j is incremented (1914) until it reaches (n−2) (1916). Then the addition of 1918 is realized to produce the resulting $R_{pp}$ matrix (1920).

The method of computing the $L_{pp}$ matrix used in the electrical DTM 1808 is shown in the exemplary method flowchart 2000 of FIG. 20 to compute equation 52 for a multi-phase BLDC motor receives the phase resistance matrix M and the number of phases n (2002), and computes a $L_{pp}$ matrix (2020). The increment variables/and j are initialised to one and the $L_{pp}$ matrix is initially set to zero (2004). The elements of matrix M are assigned to the elements of the $L_{pp}$ matrix (2010) through the auxiliary variable F 2008 as the variable j is incremented j<n (2014) and the variable i is incremented (2016) in order to traverse all columns (2014) and lines i<n (2018) to produce matrix $L_{pp}$ (2020).

The method of computing the matrices [$A_{pp}$, $B_{pp}$, $U_{pp}$] of equation 50 used in the electrical DTM 1808 is shown in the exemplary flowchart 2100 of FIG. 21 to compute equation 50 for a multi-phase BLDC motor receives the $R_{pp}$ matrix (1920), the $L_{pp}$ matrix (2020), the output vector V of 1802, the output vector E of 1824 and the number of phases n (2102), and computes matrices [$A_{pp}$, $B_{pp}$, $U_{pp}$] (2110) by computing the phase-phase vector voltages $V_{pp}$ 2112 and $E_{pp}$ 2114 defined in equation 50, the matrices $A_{pp}$, (2104), $B_{pp}$ (2106) and $U_{pp}$ (2108) resulting in the matrices [$A_{pp}$, $B_{pp}$, $U_{pp}$] (2110).

Figure 22:
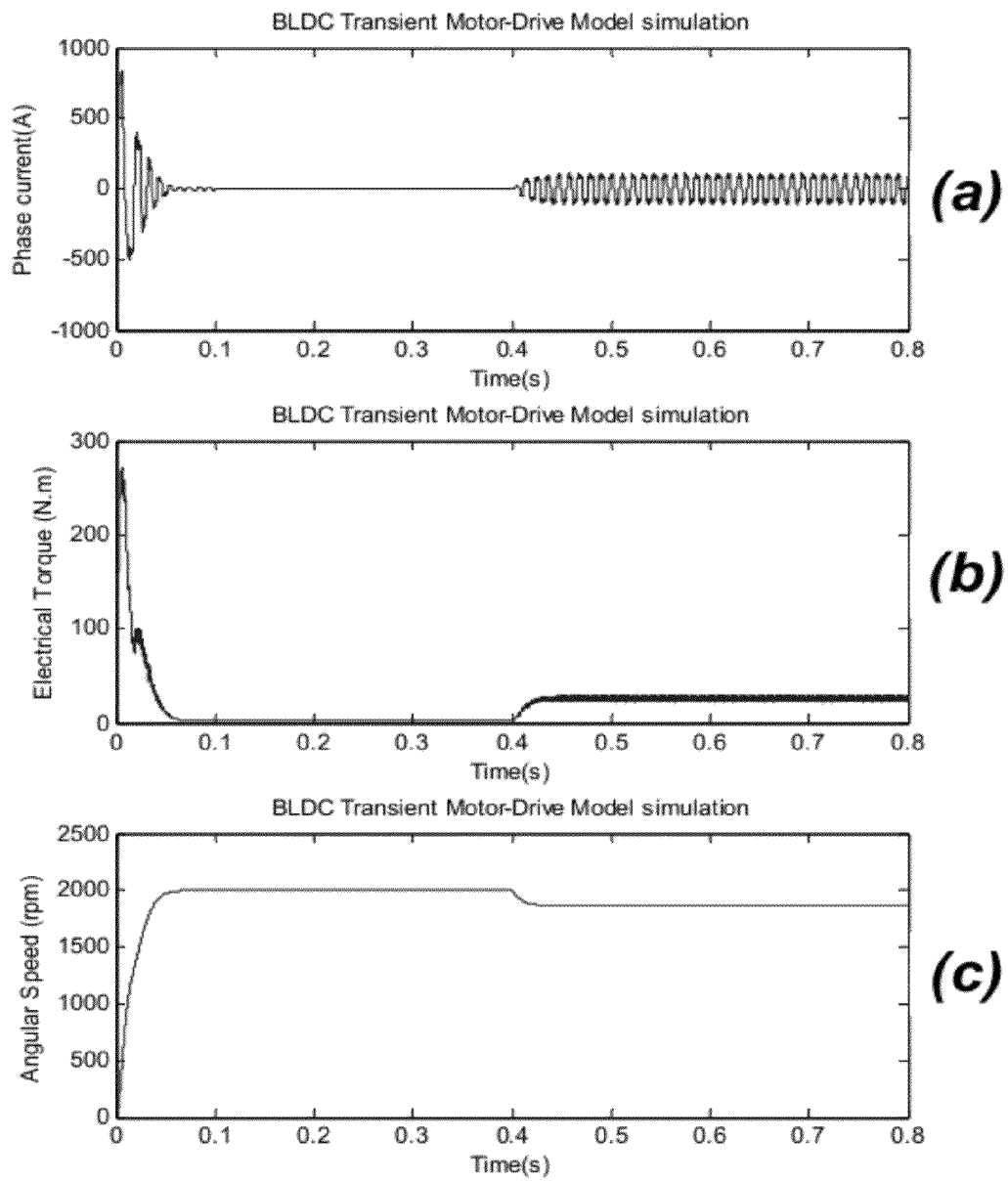
FIG. 22 shows plots illustrating the real-time dependence (transient simulation) of a seven-phase BLDC motor-drive model simulation.
Figure 23:
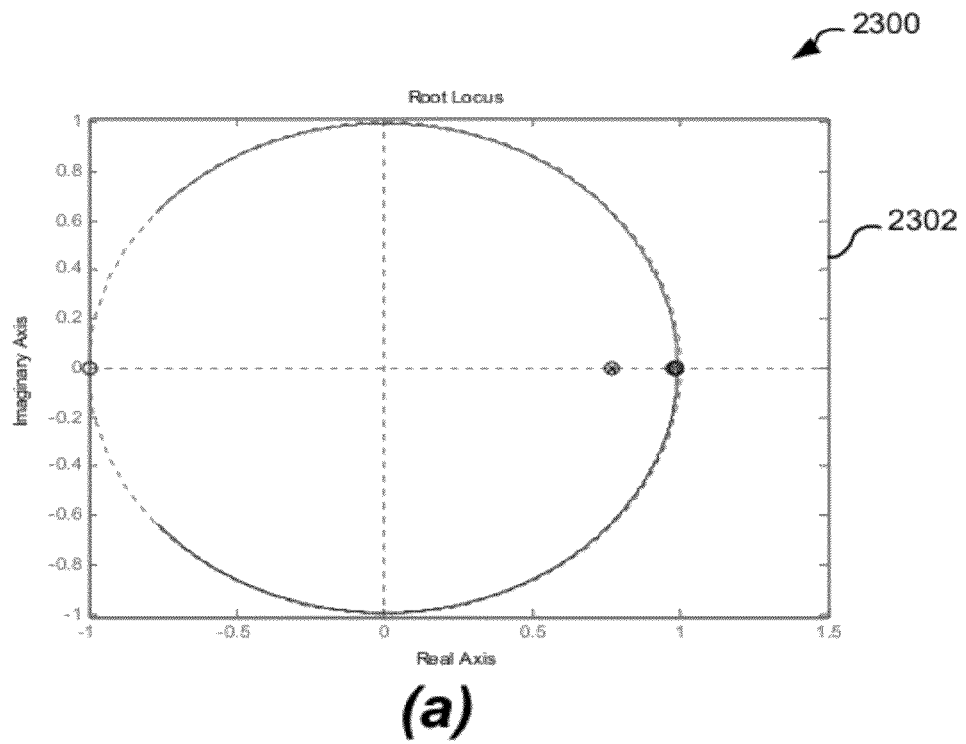
FIG. 23 shows plots illustrating the root locus of a seven-phase BLDCM DTM for the Trapezoidal discretization rule (FIG. 23a) and for the high-order approximation with order equal to 6 (i, j, k)=(2, 4, 0) (FIG. 23b).
Figure 23:
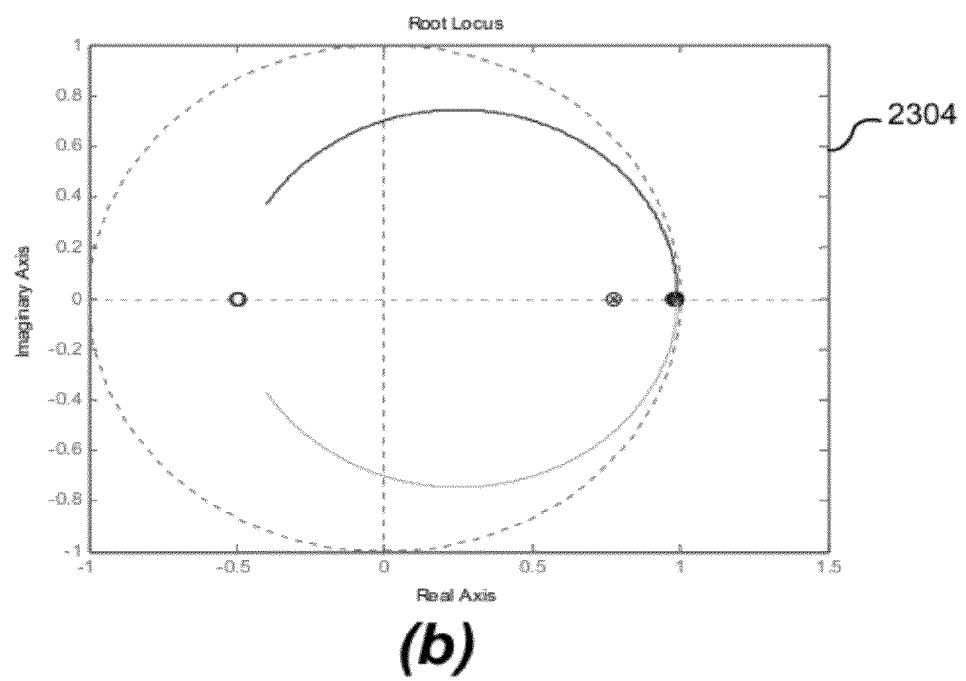

FIG. 22 shows the plots (a) to (c) for the phase current, the electrical torque and the angular speed illustrating the real-time dependence (transient simulation) of a seven-phase BLDC motor-drive model simulation. The electrical CTM of equations 50-53 and the mechanical CTM of equations 56-57 were discretized using the method of this disclosure to produce the electrical DTM 1808 and the mechanical DTM 1816. The discretization method was configured as a sixth-order DTM (k=2 and j=4) with a ZOH at the input signals. The motor is operating in open-loop (without current or voltage control) in order to avoid masking any possible error or distortion that could have been introduced by the discretization method. As shown in FIG. 22, the motor is started with a fixed load torque. After some time, the torque is reduced such that the BLDCM operates as a generator and the shaft speed is reduced to a new steady-state speed. FIG. 22 shows the method is stable and match the results predicted by theory.

It should be noted that the methods, drawings and embodiments described in this disclosure are not limited to the examples but can be used in a wide area of applications.

Implementation of the DTM

After obtaining the discrete-time state-space model 128 of equation 2 using the higher-order Obreshkov-based method 134, the DTM can be implemented 129 in software to run in a microprocessor or a DSP or in hardware to run in an Application Specific Integrated Circuit (ASIC) or an FPGA. This process is not straightforward and some of the potential problems, including the accuracy and stability of the approximation, scalability with increased accuracy, dynamic range which determines whether the approximation is implemented in fixed-point or floating-point representation 210, the reduction of quantization errors and overflow of intermediate results 212. It will become clear to those skilled in the art of sampled data systems from the drawings and embodiments described here, that unconditionally stable DTM approximations of CTM can be constructed which solves or mitigates all the problems described herewith.

Looking at equation 1b, the exponential matrix is related to the response of the system to non-forced input whereas the term inside the integral is dependent of the input signal and all its derivatives. Different than the existing methods, the three parameters i, j and k 104 of equations 34, 35, 40 and 41 provide independent control on the accuracy of the approximation for the non-forced (natural response) and the input-dependent response. Summarizing the demonstrations in the previous sections, the parameters (i, j) of the Obreshkov coefficients can be used to configure a high-order approximation (order=i+j) for the CTM state transition matrix such that the approximation is unconditionally stable if and only if j−2≤i≤j 1200, 1400, 2300. The parameter k, on the other hand, controls which derivatives of the input signal vanishes in the approximation and, therefore, independently controls the accuracy of the forced response 1100, 1300. Thus, the present disclosure provides the user with a more stable and accurate approximation as well as a more flexible means to tune the accuracy of the approximation to the stability and accuracy requirements of the DTM implementation 129, 216, 218.

In practical applications, it is often required the DTM state-space matrices to be quantized to a fixed-point representation. Although DTM obtained by the discretization method could be stable, which implies all its poles stay inside the unity circle, the quantization process may cause some of the stable poles of the non-quantized DTM to fall over or outside of the unity circle causing the DTM fixed-point implementation to become unstable or marginally stable. The traditional approaches 2302 mitigate this problem by simply increasing the number of bits of the fixed-point representation, which incurs a higher-cost in terms reduced speed and increase of the hardware required for implementation. The present disclosure addresses this problem in a fundamentally different way. Demonstrating this fact requires comparing the root locus resulting from the DTM obtained from the current disclosure with the root locus obtained from a DTM constructed by the traditional approaches. For this purpose, FIG. 23a respectively show the root locus obtained by the well-known traditional approach of the trapezoidal rule 2302 and FIG. 23b shows the root locus of a $6^{th}$ order DTM implementation of the current disclosure for a CTM representation of the BLDC motor of FIGS. 17 and 18. From FIG. 23a, it is clear that, although the root locus for the traditional approach remains inside the unit circle, indicating that the DTM is stable, it stays almost coincidental with the unit circle. This fact means that any slight noise arising from the quantization with a finite number of bits can push the DTM out of the stability region causing the resulting fixed-point DTM to become unstable. By contrast, the root locus obtained from the current disclosure and shown in FIG. 23b remains inside the unit circle and by a large safety margin. This is considered an important advantage for present method since it increases the natural immunity against quantization noise and, as a consequence, reduces the cost of implementation by requiring a smaller number of bits to represent DTMs than traditional discretization methods.

Implementation of the DTM in Software

After obtaining the discrete-time state-space model 128 of equation 2 using the higher-order Obreshkov-based method, the next step could be to implement it in software to run in a microprocessor or a DSP 129.

All the existing high-order discretization methods show a faster than linear growth in the complexity of implementation with an increase of the order of the approximation. Except for very small systems, this intrinsic characteristic of these methods creates a limitation in its use for practical applications which normally involves a large number of states and input signals. As shown in FIG. 3 of 300 and FIG. 4 of 400, this disclosure, on the other hand, shows a linear growth of the implementation complexity with the number of states and inputs 406 which makes it an ideal method to discretize large and complex systems. In addition, an increase of one in the order is achieved by adding one additional state-space solver such that each (Zero-order DTM) partial state-space solver is responsible for independently calculating the contributions of each derivative 406. It is an important property of the disclosed method that the only point of interaction between those solvers is the summation operation to calculate X(z) 408. Different than the existing high-order methods where the scaling, transforming, quantization and accumulator overflow/underflow needs to be done on the whole model (which imposes more stringent requirements), the current disclosure allows for the requirements to be applied on each state-space solver separately 406. Due to the modular and localized nature of the disclosure, it provides the user with higher flexibility to choose the best appropriated values in order to reduce quantization and overflow errors. Besides, the user can exploit further optimization by choosing to implement each solver in floating or fixed point representation independently, and even with a different number of bits, in order to achieve better balance between speed and accuracy. The user could further exploit those two properties to implement a scalable software implementation by creating a parameter-driven function with parameters (i, j, m) to calculate all of the m-terms, use them to calculate the m state-spaces related to the m-derivatives, and interactively do the summation in order to obtain the DTM approximation.

Implementation of the DTM in Hardware

The disclosed system and method lends itself very well to the implementation of unconditionally stable high-order DTMs directly in hardware. Some existing high-order methods such as the Runge-Kutta have been used to implement high-order DTM in software. However, these methods do not lend themselves well for hardware implementation. The two methods currently used for hardware implementation of DTMs are the Backward Euler and the Trapezoidal (also called Tustin) approximations. However, the first method is of low order and the second method does not respect the L-stability criteria.

An exemplary implementation in hardware could be to exploit the modular and localized properties of the current disclosure 300 400 to develop a parameter-driven state-space solver and instantiate it m times 406. The output of each solver is fed to an accumulation module responsible for adding up all the intermediate results 406, multiplying the result by the C matrix of the CTM 402, and adding 410 the contribution relative to the CTM D matrix 404 to obtain the DTM approximation. As shown in FIG. 4, the modularity and locality properties can be further exploited to implement an automatic code generation tool by creating a parameter-driven function with parameters (i, j, m) to generate all of the m intermediate state-spaces 406, for example, in an HDL language, instantiate them as briefly shown in FIG. 4 taking into account the contribution of all the m-derivatives 102, and provide the partial results to an add MAC (Multiply-And-Accumulate) module in order to obtain the DTM approximation 128 129 and the output signals at the sampling time 110.

In summary, the discretization of CTMs 104 and the determination of the state-space matrices of an equivalent DTM 128 129 is based on the Obreshkov method. The state-space matrices of the high-order DTM 134 could be calculated off-line by means of the method described in current disclosure. The approximated model parameters are then the basis for its implementation in hardware or in software 129. In order to achieve higher order of approximation, a calculation of the intermediate state-spaces 406 where each independent state-space is related only to one derivate is realized and summed up to obtain the complete DTM 408. As opposed to the existing methods, the current disclosure is unconditionally stable, modular and localized enabling the development of faster and cost-effective DTM implementations.

Although the above discloses example methods, apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The invention claimed is:

1. A method for execution by a processor, the method comprising:

retrieving from the memory a continuous time model (CTM) defining a continuous-time electrical or mechanical system;

determining a sampling time and CTM state-space matrices [A, B, C, D] for the CTM defined for a dynamical system ordinary differential equation mathematical formulation;

determining an order of approximation [i,j,k] parameters of the coefficients of an Obreshkov integration formula, to be used in determining a discrete time model (DTM) [$A_{dm}$, $B_{dm}$, $C_{dm}$, $D_{dm}$] to provide an approximation of accuracy and to meet A- or L-stability requirements defined for the dynamical system; and discretizing the CTM into the DTM using the selected order of approximation [i,j,k], and the CTM state-space matrices [A, B, C, D] and sampling time (T) by calculating Obreshkov-coefficient and matrices [$A_{dm}$, $B_{dm}$, $C_{dm}$, $D_{dm}$] using Obreshkov-based polynomial matrices; and storing the DTM representing the continuous-time electrical or mechanical system to the memory;

wherein subscript d in the state-space matrix refers to a matrix for the DTM and m subscript refers to the parameter k of the order of the discretization such that 0<=m<=k and the DTM is a fixed point or a floating point representation.

2. The method of claim 1 wherein the sampling time and the order of approximation [i,j,k] parameters are selected to meet A-stability requirements when the parameter i is set equal to j and L-stability requirements when condition i=j+1 or i=j+2 is satisfied.

3. The method of claim 1 further comprising computing the output signals y(nT) at the sampling time using the calculated Obreshkov coefficients and matrices [$A_{dm}$, $B_{dm}$, $C_{dm}$, $A_{dm}$], inputs u(nT) and its k-order derivatives $u^{(k)}$(nT).

4. The method of claim 2 wherein the DTM can then be implemented in hardware or software using the value of the inputs (u(nT)) and its k-order derivatives ($u^{(k)}$(nT)) at the sampling time to compute the output signals (y(nT)).

5. The method of claim 3 wherein the DTM state-space representation is obtained through an Obreshkov-based mapping to map the state-space matrices of the CTM into matrices of the DTM system where a CTM is described by the following state-space representation:

$$\frac{dx(t)}{dt} = Ax(t) + Bu(t)$$

$$y(t) = Cx(t) + Du(t)$$

and where for a particular case of linear time-invariant systems (LTI) is represented by:

$$x(t) = e^{A(t-t0)}x(t0) + \int_{t0}^{t} e^{A(t-\tau)}B(\tau)u(\tau)d\tau$$

wherein x(t), u(t) and y(t) are vectors representing states, inputs and outputs of the system respectively.

6. The method of claim 3 wherein the parameters (i, j, k) of the Obreshkov coefficients are used to configure a high-order approximation (order=i+j) for the CTM state transition matrix such that the approximation is unconditionally stable if and only if j−2≤i≤j and where the parameter k, controls which derivatives of the input signal vanishes in the approximation and, therefore, independently controls accuracy of the forced response.

7. The method of claim 3 where in representation of a continuous-time system such as electrical system or mechanical system is provided as the transfer function representation defined by $$H(s) = \frac{b_0 s^N + \ldots + b_{N-1}s + b_N}{s^N + \ldots + a_{N-1}s + a_N}$$

converted into a continuous-time state-space representation in which $$A = \begin{bmatrix} 0 & 1 & 0 & \ldots & 0 \\ 0 & 0 & 1 & \ldots & 0 \\ \vdots & \vdots & \vdots & \ddots & \vdots \\ 0 & \ldots & 0 & 0 & 1 \\ -a_N & \ldots & -a_3 & -a_2 & -a_1 \end{bmatrix} B = \begin{bmatrix} 0 \\ \vdots \\ 0 \\ 0 \\ 1 \end{bmatrix}$$

$$C = [(b_N - b_0 \cdot a_N) \ (b_2 - b_0 \cdot a_2) \ (b_1 - b_0 \cdot a_1)]$$

$$D = b_0$$

where N is the order of the dynamical system where $a_i$ and $b_i$, i=0, 1, . . . N are real numbers.

8. The method of claim 3 wherein determining the DTM is implemented using fixed point representation the method further comprising:
scaling each element of the zero-order DTMs by a multiplication factor to increase the accuracy by a defined multiple; and
quantizing each element of the zero-order DTMs to remove floating point decimal components.

9. The method of claim 8 wherein scaling of the zero-order DTM matrices is scaled by, for example, a L2-norm dynamic range scaling method to increase accuracy of the model by ensuring the entries of the A, B, and C matrices are homogenous in magnitude and the DTM characteristics are insensitive to small perturbations in A, B, and C in comparison to their norms, and quantization is performed by truncation or rounding of the elements of the DTM matrices.

10. The method of claim 8 wherein an order of approximation [i,j,k] parameters of the coefficients of an Obreshkov integration formula is selected to be used in optimizing the tradeoffs between the accuracy requirements and the number of bits of the fixed-point representation used for the scaling of the DTM matrices.

11. The method of claim 3 wherein the order of approximation can be increased by instantiating zero-order DTMs of [$A_{dm}$, $B_{dm}$, $C_{dm}$, $A_{dm}$] where m can vary from 0 up to k.

12. The method of claim 11 wherein the output of each zero-order DTM is combined to as a parallel combination of k structures of zero-order DTMs where an output of each zero-order DTM (0 to k) is summed.

13. The method of claim 12 wherein the Obreshkov-based polynomial matrices [$L_m$, $H_m$] and [$Q_m$, $G_m$] are defined by:

$$H_m(AT) := \sum_{k=m}^{j} (-1)^k \alpha_{j,i,k}(AT)^{k-m};$$

$$L_m(AT) := \sum_{k=m}^{i} \alpha_{i,j,k}(AT)^{k-m};$$

$$G_m(AT) = \sum_{k=0}^{m-1} \alpha_{j,i,k}(AT)^k + (AT)^m H_m(AT); \text{ and}$$

$$Q_m(AT) = \sum_{k=0}^{m-1} -\alpha_{i,j,k}(AT)^k + \sum_{k=0}^{m-1} (-1)^k \alpha_{j,i,k} L_m(AT) H_m^{-1}(AT)(AT)^k.$$

14. The method of claim 13 wherein discretizing the CTM into the DTM further comprises:
determining [$A_{dm}$, $B_{dm}$, $C_{dm}$, $A_{dm}$] where $A_{dm}=L_m(AT)H_m^{-1}(AT)-Q_m(AT)G_m^{-1}(AT)$ $B_{dm}=Q_m(AT)G_m^{-1}(AT)H_m(AT)(BT$ $C_{dm}=G_m^{-1}(AT)$ $D_{dm}=-G_m^{-1}(AT)H_m(AT)(BT)$.

15. The method of claim 14 wherein the discrete-time state variable $x^*_m$(k, T) at the sampling time are defined by:

$w_m(n+1,T)=A_{dm}w_m(n,T)+B_{dm}u(n,T)$ $x^*_m(n,T)=C_{dm}w_m(n,T)+D_{dm}u(n,T)$ where DTM output is defined by:

$$Y(z) := DU(z) + c\sum_{m=0}^{k} X_m^*(z)$$

or equivalently $$y(n, T) := Du(n, T) + \sum_{m=0}^{k} x_m^*(n, T)$$

using the determined DTMs defined by [$A_{dm}$, $B_{dm}$, $C_{dm}$, $A_{dm}$], where DU(z) is the matrix D multiplied by input vector U(z), U(z) is the Z-transform of the input vector u(t) and U(nT) is a sampled data version of u(t) where nT (n=0, 1, 2, 3, . . . ) are sample times.

16. An apparatus the apparatus comprising:
a processor for executing instructions stored in a memory coupled to the processor, the instructions for performing:
retrieving from the memory a continuous time model (CTM) defining a continuous-time electrical or mechanical system;
receiving a discrete time model (DTM) output and determining a sampling time (T) and CTM state-space matrices [A, B, C, D] defined for a dynamical system ordinary differential equation mathematical formulation;
determining an order of approximation [i,j,k] parameters of the coefficients of an Obreshkov integration formula, to be used in determining the DTM [$A_{dm}$, $B_{dm}$, $C_{dm}$, $D_{dm}$] to provide an approximation of accuracy and to meet A- or L-stability requirements defined for the dynamical system;
discretizing the CTM into a DTM using the selected order of approximation [i,j,k], and the CTM state-space matrices [A, B, C, D] and sampling time by calculating Obreshkov coefficients and matrices [$A_{dm}$, $B_{dm}$, $C_{dm}$, $D_{dm}$] using Obreshkov polynomial matrices; and
storing the DTM representing the continuous-time electrical or mechanical system to the memory;
wherein subscript d in the state-space matrix refers to a matrix for the DTM and m subscript refers to the parameter k of the order of the discretization such that 0<=m<=k and the DTM is a fixed point or a floating point representation.

17. The apparatus of claim 16 further comprising computing the output signals y(nT) at the sampling time using the calculated Obreshkov-based coefficients and matrices [$A_{dm}$, $B_{dm}$, $C_{dm}$, $D_{dm}$], inputs u(nT) and its k-order derivatives $u^{(k)}$(nT).

18. The apparatus of claim 16 wherein the order of approximation can be increased by instantiating zero-order DTMs of [$A_{dm}$, $B_{dm}$, $C_{dm}$, $D_{dm}$] where m can vary from 0 up to k.

19. The apparatus of claim 18 wherein the output of each zero-order DTM is combined to as a parallel combination of k structures of zero-order DTMs where the output of each zero-order DTM (0 to k) is summed.

20. The apparatus of claim 16 wherein the Obreshkov-based polynomial matrices [$L_m$, $H_m$] and [$Q_m$, $G_m$] are defined by:

$$H_m(AT) := \sum_{k=m}^{j} (-1)^k \alpha_{j,i,k}(AT)^{k-m};$$

$$L_m(AT) := \sum_{k=m}^{i} \alpha_{i,j,k}(AT)^{k-m};$$

$$G_m(AT) = \sum_{k=0}^{m-1} \alpha_{j,i,k}(AT)^k + (AT)^m H_m(AT); \text{ and}$$

$$Q_m(AT) = \sum_{k=0}^{m-1} -\alpha_{i,j,k}(AT)^k + \sum_{k=0}^{m-1} (-1)^k \alpha_{j,i,k} L_m(AT) H_m^{-1}(AT)(AT)^k.$$

21. The apparatus of claim 20 wherein discretizing the CTM into the DTM further comprises:
determining [$A_{dm}$, $B_{dm}$, $C_{dm}$, $D_{dm}$] where $$A_{dm} = L_m(AT) H_m^{-1}(AT) - Q_m(AT) G_m^{-1}(AT)$$

$$B_{dm} = Q_m(AT) G_m^{-1}(AT) H_m(AT)(BT)$$

$$C_{dm} = G_m^{-1}(AT)$$

$$D_{dm} = -G_m^{-1}(AT) H_m(AT)(BT).$$

22. An apparatus for executing a discrete time model (DTM) the apparatus comprising:
a processor coupled to a memory, the memory containing instructions which when executed by the processor performing:
retrieving from the memory a continuous time model (CTM) defining a continuous-time electrical or mechanical system;
computing an approximation for output signals y (nT) at the sampling time (T) comprising:

$$w_m(n+1,T) = A_{dm} w_m(n,T) + B_{dm} u(n,T)$$

$$x^*_m(n,T) = C_{dm} w_m(n,T) + D_{dm} u(n,T)$$

where a DTM output is defined by:

$$Y(z) := DU(z) + C \sum_{m=0}^{k} X^*_m(z)$$

or equivalently $$y(n, T) := Du(n, T) + \sum_{m=0}^{k} x^*_m(n, T)$$

where Y(z), U(z), $X^*_m$(z) are the Z-transform of an equivalent y(n,t), u(n,t), $x^*_m$(n,t)
using DTMs defined by [$A_{dm}$, $B_{dm}$, $C_{dm}$, $D_{dm}$] for the CTM discretized using a selected order of approximation [i,j,k], and CTM state-space matrices [A, B, C, D] and a sampling time by calculated by Onreshkov coefficient and matrices [$A_{dm}$, $B_{dm}$, $C_{dm}$, $D_{dm}$] using Obreshkov-based polynomial matrices where $w_m$ is an auxiliary state variable, n is the timestep number, z is the z-transform variable and $x_m$ is the dynamical system state variable; and
storing the DTMs representing the continuous-time electrical or mechanical system to the memory,
wherein the DTMs are fixed point or floating point representations and the Obreshkov-based polynomial matrices [$L_m$, $H_m$] and [$Q_m$, $G_m$] are defined by:

$$H_m(AT) := \sum_{k=m}^{i} (-1)^k \alpha_{j,i,k}(AT)^{k-m};$$

$$L_m(AT) := \sum_{k=m}^{i} \alpha_{i,j,k}(AT)^{k-m};$$

$$G_m(AT) = \sum_{k=0}^{m-1} \alpha_{j,i,k}(AT)^k + (AT)^m H_m(AT); \text{ and}$$

-continued $$Q_m(AT) = \sum_{k=0}^{m-1} -\alpha_{i,j,k}(AT)^k + \sum_{k=0}^{m-1} (-1)^k \alpha_{j,i,k} L_m(AT) H_m^{-1}(AT)(AT)^k$$

the discretizing the CTM into the DTM further comprises:
determining $[A_{dm}, B_{dm}, C_{dm}, D_{dm}]$ where $A_{dm} = L_m(AT)H_m^{-1}(AT) - Q_m(AT)G_m^{-1}(AT)$ $B_{dm} = Q_m(AT)G_m^{-1}(AT)H_m(AT)(BT)$ $C_{dm} = G_m^{-1}(AT)$ $D_{dm} = -G_m^{-1}(AT)H_m(AT)(BT)$.

23. The apparatus of claim 22 wherein determining the DTM output is implemented using fixed point representation the method further comprising:
scaling each element of the zero-order DTM given by $[A_{dm}, B_{dm}, C_{dm}, D_{dm}]$ by a multiplication factor to increase the accuracy by a defined multiple; and
quantizing each element of the zero-order DTM to remove floating point decimal components.

24. The apparatus of claim 22 wherein scaling of the zero-order DTM matrices is scaled by a L2-norm dynamic range scaling method to increase accuracy of the model by ensuring the entries of the A, B, and C matrices are homogenous in magnitude and the DTM characteristics are insensitive to small perturbations in A, B, and C in comparison to their norms, and quantization is performed by truncation or rounding of the elements of the DTM matrices.

25. The apparatus of claim 24 wherein the DTM can then be implemented in hardware or software using the value of inputs (u(nT)) and its k-order derivatives ($u^{(k)}(nT)$) at the sampling time to compute the output signals (y(nT)).

26. The apparatus of claim 22 wherein the DTM state-space representation is obtained through an Obreshkov-based mapping to map the state-space matrices of the CTM into matrices of the DTM system where a CTM is described by the following state-space representation:

$$\frac{dx(t)}{dt} = Ax(t) + Bu(t)$$
$$y(t) = Cx(t) + Du(t)$$

and where for a particular case of linear time-invariant systems (LTI) is represented by:

$$x(t) = e^{A(t-t0)}x(t0) + \int_{t0}^{t} e^{A(t-\tau)}B(\tau)u(\tau)d\tau.$$

27. The apparatus of claim 22 wherein the parameters (i, j, k) of the Obreshkov coefficients are used to configure a high-order approximation (order=i+j) for the CTM state transition matrix such that the approximation is unconditionally stable if and only if $j-2 \leq i \leq j$ and where the parameter k, controls which derivatives of an input signal vanishes in the approximation and, therefore, independently controls accuracy of the forced response.

28. The apparatus of claim 22 where in representation of a continuous-time system such as electrical system or mechanical system is provided as the transfer function representation defined by $$H(s) = \frac{b_0 s^N + \ldots + b_{N-1}s + b_N}{s^N + \ldots + a_{N-1}s + a_N}$$

converted into a continuous-time state-space representation in which $$A = \begin{bmatrix} 0 & 1 & 0 & \ldots & 0 \\ 0 & 0 & 1 & \ldots & 0 \\ \vdots & \vdots & \vdots & \ddots & \vdots \\ 0 & \ldots & 0 & 0 & 1 \\ -a_N & \ldots & -a_3 & -a_2 & -a_1 \end{bmatrix} \quad B = \begin{bmatrix} 0 \\ \vdots \\ 0 \\ 0 \\ 1 \end{bmatrix}$$

$C = [(b_N - b_0 \cdot a_N) \ (b_2 - b_0 \cdot a_2) \ (b_1 - b_0 \cdot a_1)]$ $D = b_0$ where N is the order of the dynamical system where $a_i$ and $b_i$, i=0, 1, . . . N are real numbers.

29. The apparatus of claim 22 wherein the sampling time and the order of approximation [i,j,k] parameters are selected to meet A-stability requirements when the parameter i is set equal to j and L-stability requirements when condition i=j+1 or i=j+2 is satisfied.

* * * * *